US011176062B1

(12) United States Patent
Chauvin et al.

(10) Patent No.: US 11,176,062 B1
(45) Date of Patent: Nov. 16, 2021

(54) POWER EFFICIENCY BASED ON A DYNAMIC REPORT RATE

(71) Applicant: Logitech Europe S.A., Lausanne (CH)

(72) Inventors: Nicolas Chauvin, Chexbres (CH);
Philippe Chazot, Saint-Jorioz (FR);
Myriam Douvé, Pully (CG)

(73) Assignee: Logitech Europe S.A., Lausanne (CH)

(*) Notice: Subject to any disclaimer, the term of this patent is extended or adjusted under 35 U.S.C. 154(b) by 0 days.

(21) Appl. No.: 16/888,164

(22) Filed: May 29, 2020

(51) Int. Cl.
*G06F 13/12* (2006.01)
*G06F 13/38* (2006.01)

(52) U.S. Cl.
CPC .......... *G06F 13/126* (2013.01); *G06F 13/382* (2013.01); *G06F 2213/0042* (2013.01)

(58) Field of Classification Search
CPC ................. G06F 13/126; G06F 13/382; G06F 2213/0042
See application file for complete search history.

(56) References Cited

U.S. PATENT DOCUMENTS

| 7,978,222 B2 * | 7/2011 | Schneider | H04N 5/23229 348/208.5 |
| 2001/0052035 A1 * | 12/2001 | Singer | G11B 5/5556 710/5 |
| 2016/0097878 A1 * | 4/2016 | Kikuchi | F16P 3/144 250/221 |

* cited by examiner

*Primary Examiner* — Henry Tsai
*Assistant Examiner* — John B Roche
(74) *Attorney, Agent, or Firm* — Kilpatrick Townsend & Stockton LLP

(57) ABSTRACT

A method and system configured to receive a first report from a computer peripheral device by a receiver, determine that the first report is corrupted or received at a rate slower than the first report rate, compute a current trajectory of the computer peripheral device based on one or more intervals of movement data in the first report, compute a predicted trajectory of the computer peripheral device based on the first report, compute an incremental displacement of the computer peripheral device based on the predicted trajectory. The method and system can further generate data indicative of a position or displacement of the computer peripheral device based on the predicted trajectory of the computer peripheral device and send the data indicative of a position or displacement of the computer peripheral device at an interval that is less than twice a period of the first report rate to the host computing device.

20 Claims, 18 Drawing Sheets

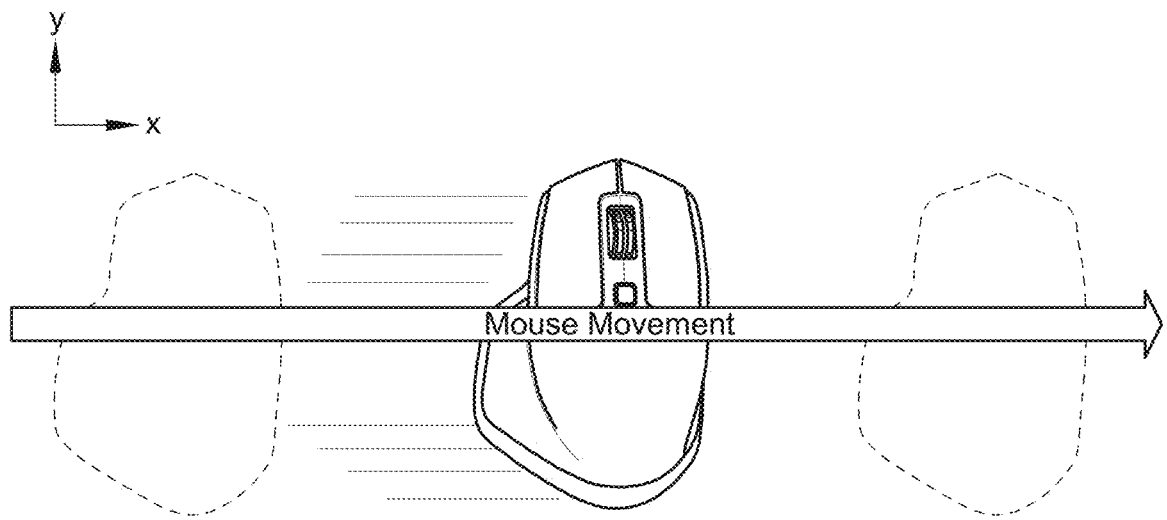
FIG. 16A
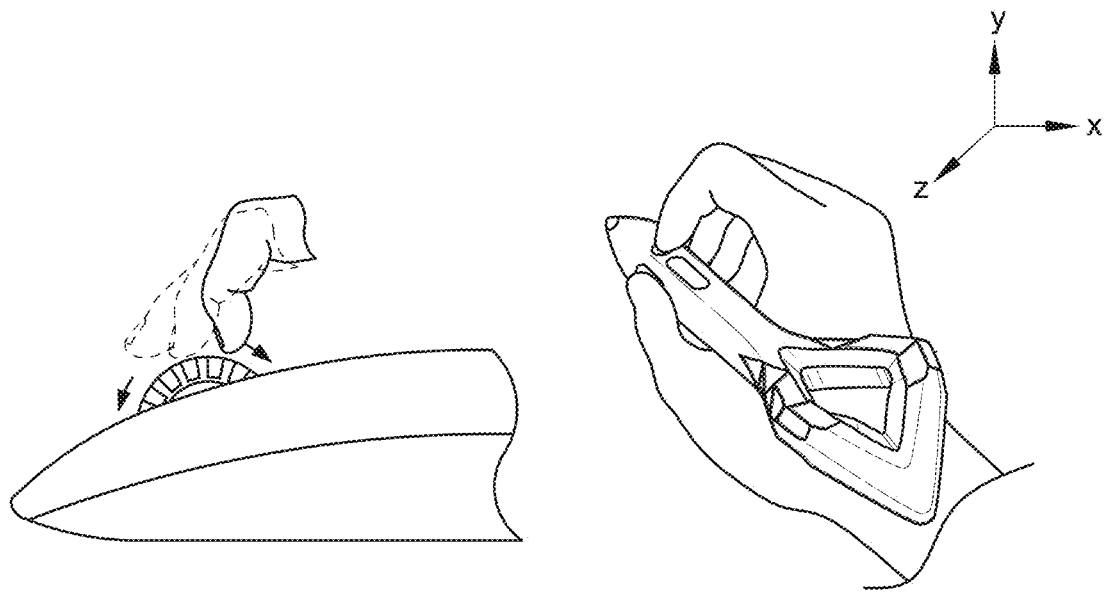
FIG. 16B
FIG. 16C

US 11,176,062 B1

POWER EFFICIENCY BASED ON A DYNAMIC REPORT RATE

CROSS-REFERENCES TO RELATED APPLICATIONS

The following two U.S. patent applications listed below (which includes the present application) are being filed concurrently, and the entire disclosures of the other applications listed below are incorporated by reference into this application in their entirety for all purposes:

application Ser. No. 16/888,164, filed May 29, 2020, entitled "IMPROVED POWER EFFICIENCY BASED ON A DYNAMIC REPORT RATE"; and application Ser. No. 16/888,184, filed May 29, 2020, entitled "PREDICTIVE PERIPHERAL LOCATING TO MAINTAIN TARGET REPORT RATE".

BACKGROUND

Currently there are a wide variety of peripheral electronic devices that are configured to communicate with a host device including mice, keyboards, headsets, trackballs and the like. Many of these peripheral devices employ wireless communications protocols to provide the user with flexibility and convenience, however traditional wireless communications protocols can experience a relatively significant time delay between when a user interacts with a peripheral device and when the host recognizes the interaction (also referred to as "latency" herein). Latency can be especially important in e-sports and competitive gaming, where fast report rates (e.g., <5 ms) are often expected in high end gaming peripheral devices, such as wireless computer mice. However, fast report rates (e.g., human interface commands, or "HID" commands) are often associated with a corresponding high power consumption that may result in low battery life in some wireless peripheral devices, which may be unacceptable for more discerning gamers.

Furthermore, in some instances, reliably maintaining a fast report rate may be challenging due to wireless interference, jitter, or other deleterious phenomena, which can cause report rates to vary beyond certain desirable specifications. As such, improvements in power consumption and reliability are needed, particularly in high performance peripheral devices with fast reporting rates.

Unless otherwise indicated herein, the information and materials described in this section is not prior art to the claims in this application and are not admitted to be prior art by inclusion in this section.

BRIEF SUMMARY

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

In certain embodiments, a computer-implemented method comprises: controlling, by one or more processors, a motion sensor (e.g., an optical sensor, accelerometer, etc.) disposed on a computer peripheral device, the optical sensor configured to generate movement data at intervals, the movement data corresponding to a tracked movement of the computer peripheral device with respect to an underlying surface; sending, by the one or more processors, a first report to a receiver coupled to a host computing device at a first report rate, the first report including one or more intervals of generated movement data, the first report being sent via a wireless communications protocol; receiving the first report by the receiver; determining, by the receiver, that the first report is corrupted or received at a rate slower than the first report rate; computing, by the receiver, a current velocity and acceleration of the computer peripheral device based on the one or more intervals of movement data in the first report; predicting, by the receiver, a trajectory of the computer peripheral device based on the first report; computing, by the receiver, an incremental displacement of the computer peripheral device based on the predicted trajectory; generating, by the receiver, data indicative of a position or displacement of the computer peripheral device based on the computed current velocity and acceleration of the computer peripheral device; and sending, by the receiver to a host computing device, the data indicative of a position or displacement of the computer peripheral device at an interval that is less than twice a period of the first report rate. The movement data can be velocity data, acceleration data, or data corresponding to a change in an angle of movement.

In some implementations, the predicting the trajectory of the computer peripheral device can be performed by a state estimator operating on the receiver, which can be a linear state estimator, a Kalman filter, an extended Kalman filter, etc., that is configured to incorporate an estimated error to balance error correction of the computed current velocity and acceleration of the computer peripheral device. In some cases, the method can include controlling, by the one or more processors, an inertial measurement unit (IMU) on the computer peripheral device, the IMU configured to generate acceleration data corresponding to the tracked movement of the computer peripheral device with respect to the underlying surface. In some embodiments, the peripheral computing device can be a computer mouse, and the receiver can be a USB dongle physically and communicatively coupled to the host computing device. Other computer peripheral devices, receivers, and host computing devices can be used, as further described in the detailed description below. In some aspects, the first report rate is 6 ms or faster.

In some embodiments, a computer-implemented method comprises: receiving a first report from a computer peripheral device by a receiver at a first report rate, the first report including one or more intervals of movement data generated by the computer peripheral device, the movement data corresponding to a tracked movement of the computer peripheral device with respect to an underlying surface, and the first report being received via a wireless communications protocol; determining, by the receiver, that the first report is corrupted or received at a rate slower than the first report rate; computing, by the receiver, a current trajectory of the computer peripheral device based on the one or more intervals of movement data in the first report; computing, by the receiver, a predicted trajectory of the computer peripheral device based on the first report; computing, by the receiver, an incremental displacement of the computer peripheral device based on the predicted trajectory; generating, by the receiver, data indicative of a position or displacement of the computer peripheral device based on the predicted trajectory of the computer peripheral device; and sending, by the receiver to a host computing device, the data indicative of a position or displacement of the computer peripheral device at an interval that is less than twice a period of the first report rate. In some cases, the movement data includes velocity and/or acceleration data, and the current trajectory can be computed based on the velocity and/or acceleration data. In certain aspects, the computing the predicted trajectory of the computer peripheral device can be performed by a state estimator operating on the receiver, which can be a linear state estimator, a Kalman filter, or an extended Kalman filter configured to incorporate an estimated error to balance error correction of the computed current trajectory (which can be based on the current velocity and acceleration) of the computer peripheral device. The first report rate is typically 6 ms or faster (in some cases, 1 ms or faster). The method can further include controlling an inertial measurement unit (IMU) on the computer peripheral device, the IMU configured to generate acceleration data corresponding to the tracked movement of the computer peripheral device with respect to the underlying surface. In some embodiments, the peripheral computing device can be a computer mouse, and the receiver can be a USB dongle physically and communicatively coupled to the host computing device, although types of peripheral computing devices, receivers, and host computing devices may be used, as further described in the detailed description below.

In further embodiments, a system comprises one or more processors and one or more machine-readable, non-transitory storage mediums that include instructions configured to cause the one or more processors to perform operations including: receiving a first report from a computer peripheral device by a receiver at a first report rate, the first report including one or more intervals of movement data generated by the computer peripheral device, the movement data corresponding to a tracked movement of the computer peripheral device with respect to an underlying surface, and the first report being received via a wireless communications protocol; determining, by the receiver, that the first report is corrupted or received at a rate slower than the first report rate; computing, by the receiver, a predicted trajectory of the computer peripheral device based on the one or more intervals of movement data in the first report; computing, by the receiver, a predicted trajectory of the computer peripheral device based on the first report; computing, by the receiver, an incremental displacement of the computer peripheral device based on the predicted trajectory; generating, by the receiver, data indicative of a position or displacement of the computer peripheral device based on the predicted trajectory of the computer peripheral device; and sending, by the receiver to a host computing device, the data indicative of a position or displacement of the computer peripheral device at an interval that is less than twice a period of the first report rate. The movement data can include velocity and/or acceleration data, and the predicted trajectory is computed based on the velocity or acceleration data. The computing the predicted trajectory of the computer peripheral device may be performed by a state estimator operating on the receiver, which can include a linear state estimator, a Kalman filter, or an extended Kalman filter configured to incorporate an estimated error to balance error correction of the computed trajectory (e.g., based on the current velocity and/or acceleration) of the computer peripheral device.

The first report rate is typically 6 ms or faster (in some cases, 1 ms or faster). The method can further include controlling, by the one or more processors, an inertial measurement unit (IMU) on the computer peripheral device, the IMU configured to generate acceleration data corresponding to the tracked movement of the computer peripheral device with respect to the underlying surface. In some embodiments, the peripheral computing device can be a computer mouse, and the receiver can be a USB dongle physically and communicatively coupled to the host computing device, although types of peripheral computing devices, receivers, and host computing devices may be used, as further described in the detailed description below.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIGS. 16A-16C show examples of different applications of the predictive techniques described herein, according to certain embodiments.

Throughout the drawings, it should be noted that like reference numbers are typically used to depict the same or similar elements, features, and structures.

DETAILED DESCRIPTION

Figure 1:
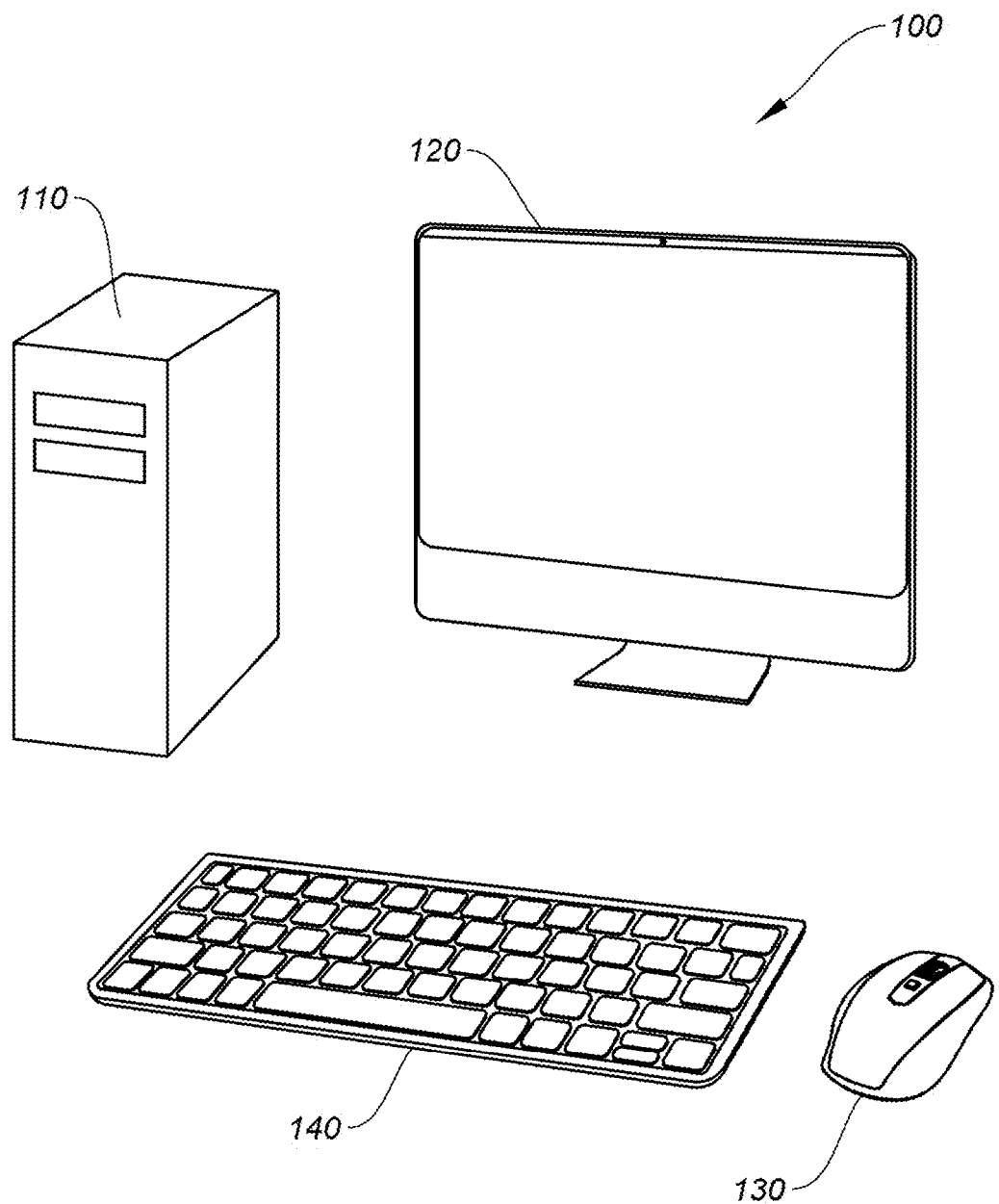
FIG. 1 shows an example of a computing system that can include any of a variety of host computing devices and peripheral devices, with peripheral devices that can be configured to perform aspects of the various inventive concepts described herein.

Aspects of the present disclosure relate generally to computer peripheral devices, and more particularly to systems and methods for dynamic report rate generation and location prediction for a peripheral device, according to certain embodiments.

In the following description, various examples and implementations of predicting a movement of a computer peripheral device are described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

The following high level summary is intended to provide a basic understanding of some of the novel innovations depicted in the figures and presented in the corresponding descriptions provided below. Aspects of the invention relate to systems and methods directed to dynamic report rate generation and location prediction for a peripheral device. For instance, some embodiments can predict a location of a peripheral device to improve certain aspects of peripheral device performance. To illustrate the advantages of such embodiments, consider that some contemporary peripheral devices, such as computer mice, have advanced in performance capabilities over the years as quick peripheral device reaction times (e.g., due to fast report rates) have become expected in high end systems, particularly with competitive gaming communities (e.g., e-sports competitors). Report rates (e.g., human interface device (HID) reports) as fast as 1 ms can be expected in high performance peripheral devices, which can be challenging to maintain when multiple peripheral devices (e.g., gaming grade computer mouse, keyboard, headset, speakers, etc.) are wirelessly coupled to and simultaneously sending data to the host device. For example, certain deleterious effects such as jitter or signal interference may cause one or more reports to be corrupted (e.g., contain indecipherable or unusable data) or lost (e.g., missing packets such as token, data, handshake, or start-of-frame packets), which can temporarily and/or periodically reduce the report rate below the target rate (e.g., 1 ms). Further still, deleterious effects aside, maintaining fast report rate can pose a significant power draw for wireless devices. For example, the implementation of wireless communication for peripheral devices (e.g., computer mice) may typically be designed to account for approximately 10% of a total power draw from a local battery. High performance devices with fast report rates may account for up to 40% of the total power budget, which can markedly reduce battery life in these devices. Aspects of the invention are directed to solving and/or remedying these issues and more by using position prediction for a peripheral device to supplement reports and increase/maintain report rates, as further described in the embodiments that follow.

To illustrate some advantages of using location prediction, consider that some peripheral devices (e.g., computer mice) may submit reports (e.g., one report or an aggregation of reports) to a wireless receiver coupled to a host computer device (see, e.g., FIG. 4) at a first report rate (e.g., 8 ms) to, e.g., control a cursor or other video element (e.g., game-based aiming reticle) on a display. Some embodiments may determine a current trajectory of the peripheral device based on the report (e.g., typically including human interface device (HID) commands) and calculate a prediction of a location of where the peripheral device will be at a later time (e.g., 1 ms later). In some cases, the prediction can be done at a markedly faster rate than the report is received (e.g., predication calculated every 125 us, 250 μs, 500 μs, 1 ms, etc., as opposed to a report rate of 8 ms) and can be used to supplement the report rate to provide a location of the peripheral device at a faster rate. In some embodiments, a new report may be created based on the predicted position of the peripheral device, which can in turn be used to control the video element at the faster report rate (e.g., 1 ms instead of 8 ms). The predicted position can be adjusted/corrected when the next report comes at the next 8 ms interval with the next actual current location of the peripheral device. By using these predictive techniques, faster report rates can be achieved, which can improve power requirements and report rate reliability, among other benefits. For example, a computer mouse may provide a report rate every 8 ms, but a revised report (e.g., a calculated actual position of the peripheral device in addition to a predicted future position or positions) can be send to the host computing device every 1 ms. These revised reports with predicted position data can significantly reduce an amount of power required by the peripheral device when generating reports because the report rate can be markedly reduced. In another example, a report may be received from a peripheral device every 1 ms, but may occasional drop below 1 ms due to interference, lost packets, etc. In such cases, a predicted position of the peripheral device can be used to supplement the actual position data to maintain, or in some cases, increase the report rate as predicted positions can be calculated at a faster rate than the incoming reports are received.

In other embodiments, the predictive techniques described herein can be used to dynamically control the operation of a computer peripheral device. More specifically, a report rate of a computer peripheral device may be dynamically controlled based on its usage. For example, when the computer peripheral device is determined to be operating relatively slowly (e.g., below a threshold velocity, acceleration, or angle of movement) or it is determined that the computer peripheral device is operating software on the host computing device that does not require high performance (e.g., a word processing application), then a receiver (or host computing device, cloud computing entity, network entity, etc.) can generate and send a command to the computer peripheral device causing it to operate at a reduced report rate (e.g., 4-10 ms report rate or slower, reduced sensor polling rate, or other reduction). Conversely, when the computer peripheral device is operating relatively quickly (e.g., at or above a threshold velocity, acceleration, or angle of movement) or it is determined that the computer peripheral device is operating software on the host computing device that does require high performance (e.g., e-sports games), then a receiver (or host computing device, cloud computing entity, network entity, etc.) can generate and send a command to the computer peripheral device causing it to operate at an increased report rate (e.g., 1 ms report rate or faster, increased sensor polling rate, or other performance enhancement). There are many additional advantages, some of which are discussed below, as would be appreciated by one of ordinary skill in the art with the benefit of this disclosure.

Some embodiments may perform the various predictive techniques described herein at a wireless receiver (e.g., a USB dongle) coupled to a host computing device that wirelessly receives data (e.g., reports) from the peripheral device, as lost packets are often the result of some interference or anomalous effects that occur during transmission rather than via hardwired connections. Although many of the embodiments described below are configured this way, it should be understood that the predictive techniques may be performed by the peripheral device, by the host computing device, or a combination thereof, which may depend on the application of the predictive techniques (e.g., power reduction, report rate management, etc.).

In some aspects, velocity and acceleration data for a peripheral device (e.g., a displacement of a computer mouse along an underlying surface, a rotation of a scroll wheel, etc.) can be used to calculate a current trajectory and predict where the peripheral device will be at a certain time or interval (e.g., 1 ms later) based on the current trajectory. Velocity data can be received from a motion sensor, optical sensor, hall effect sensor, or the like, and acceleration data may be received from an inertial measurement unit (IMU), which may include an accelerometer, for example. In some embodiments, the predicting can be performed by a state estimator, which may incorporate a linear state estimator, Kalman Filter (KF), or an extended Kalman filter (EKF) configured to incorporate an estimated error to balance error correction of the computer current velocity and acceleration of the computer peripheral device that were previously predicted. Further details are provided in the embodiments that follow.

FIG. 1 shows an example of a computing system 100 that can include any of a variety of host computing devices and peripheral devices, including peripheral devices (e.g., a computer mouse) that can be configured to perform aspects of the various inventive concepts described herein. Computing system 100 shows a host computing device (shown as a desktop computer) 110 and a number of peripheral devices communicatively coupled to the host computing device, include a display device 120, a computer mouse 130, and a keyboard 140. Although the host computing device is shown as a desktop computer, other types of host computing devices can be used including gaming systems, laptop computers, set top boxes, entertainment systems or any other suitable host computing device (e.g., smart phone, smart wearable, or the like). In some cases, multiple host computing devices may be used and one or more of the peripheral devices may be communicatively coupled to one or both of the host computing devices (e.g., a mouse may be coupled to multiple host computing devices). A host computing device may be referred to herein as a "host computer," "host device," "host computing device," "computing device," "computer," or the like, and may include a machine readable medium (not shown) configured to store computer code, such as driver software, firmware, and the like, where the computer code may be executable by one or more processors of the host computing device to control the one or more peripheral input devices.

Figure 5:
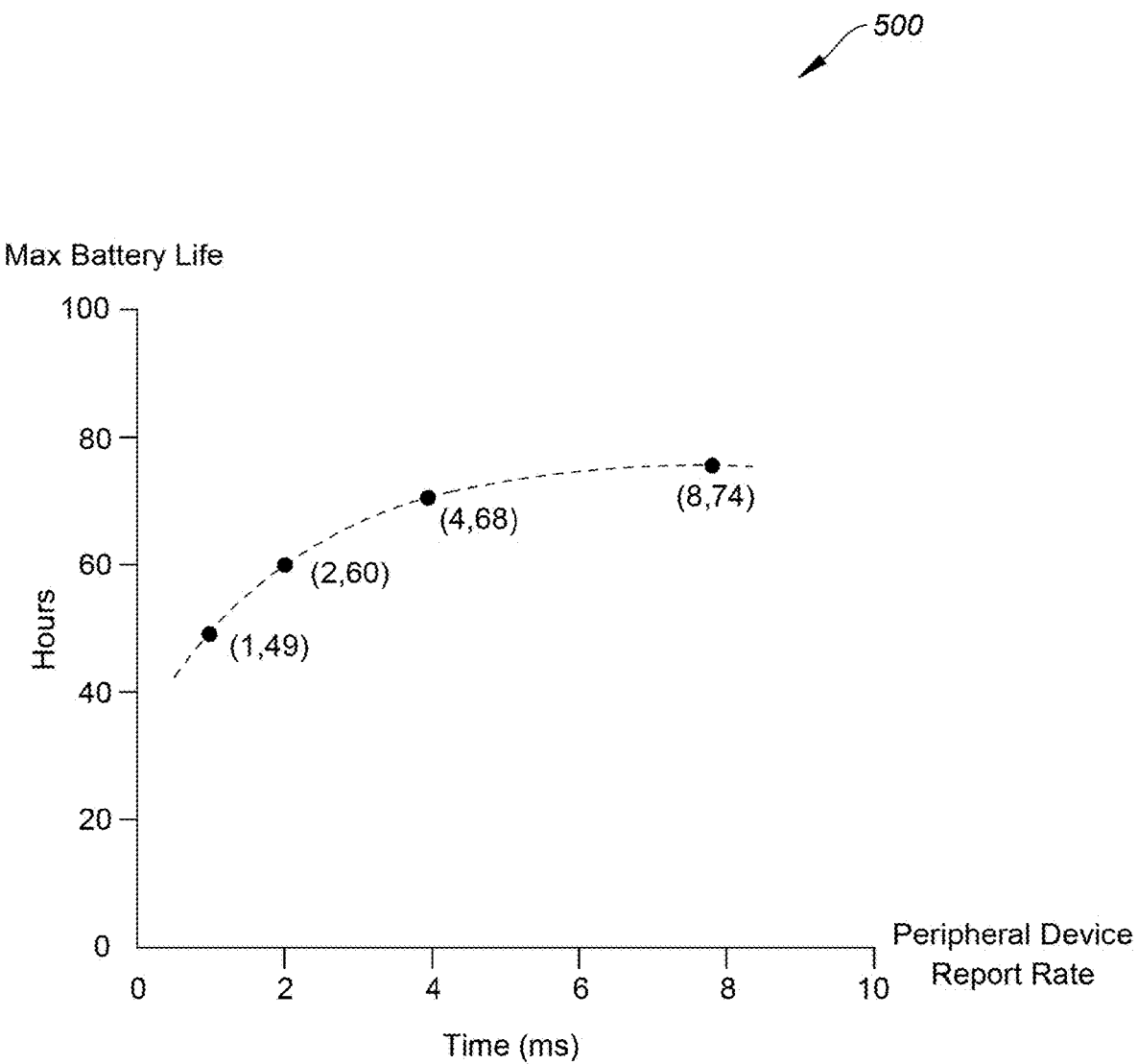
FIG. 5 is a graph showing a relationship between a report rate and a maximum battery life for a peripheral device, according to certain embodiments.
Figure 6:
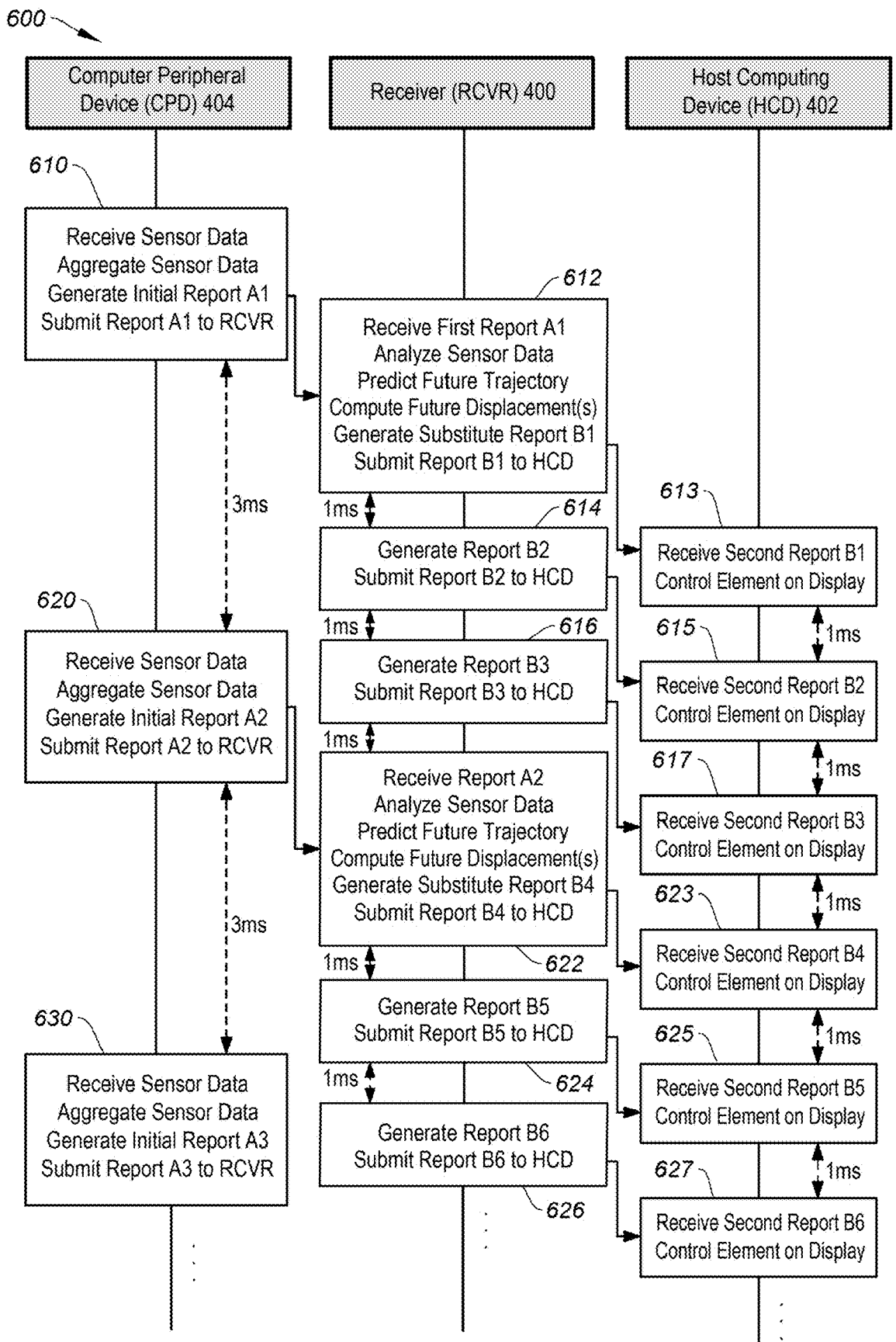
FIG. 6 is a swim lane diagram showing aspects of a method of predicting a displacement of a peripheral device to achieve an increased report rate and lower power dissipation, according to certain embodiments.
Figure 7:
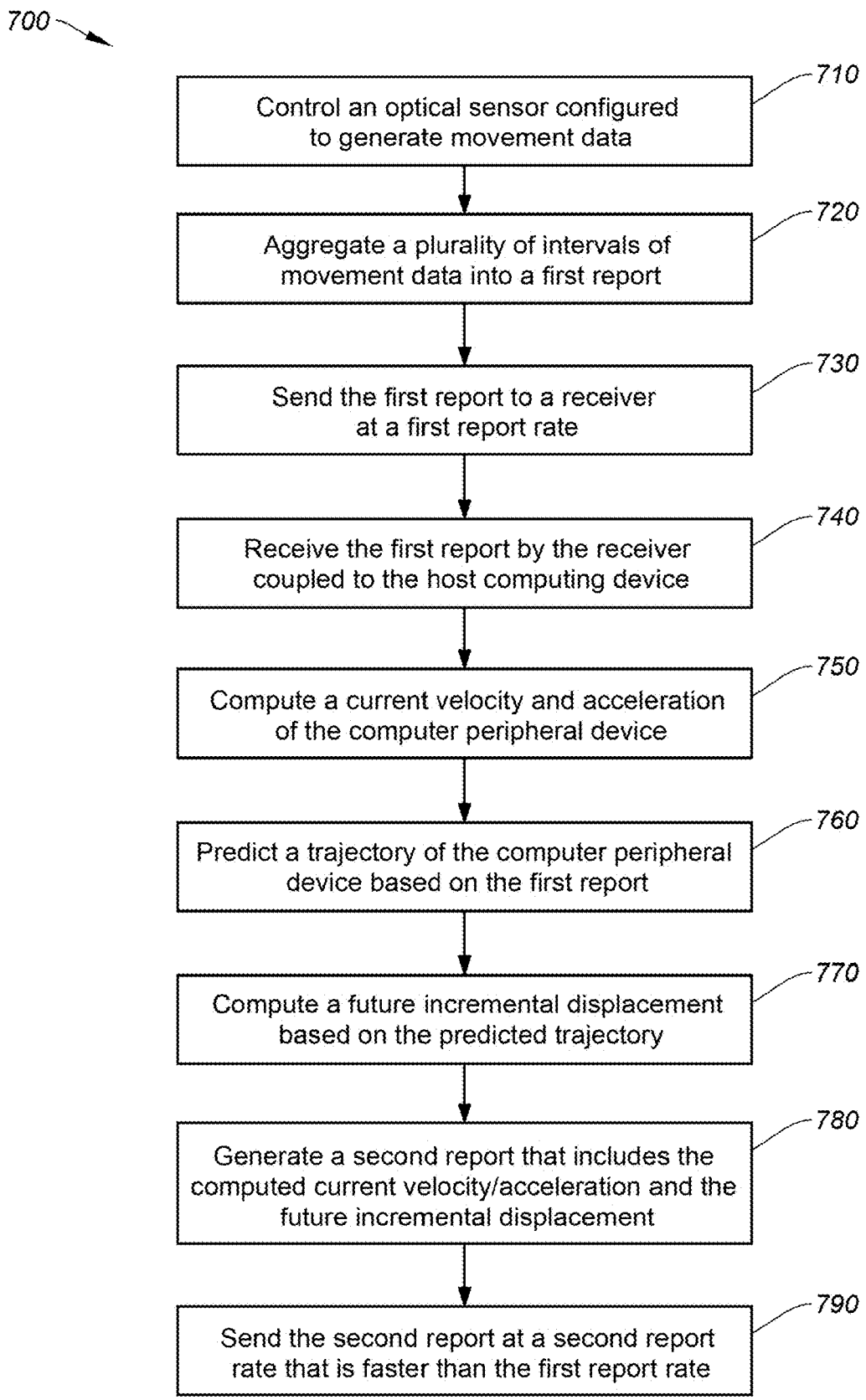
FIG. 7 is a simplified flow chart showing aspects of a method for predicting a displacement of a peripheral device to achieve an increased report rate and lower power dissipation, according to certain embodiments.

A typical peripheral device can include any suitable input peripheral, output peripheral or input/output peripheral device including those shown or any peripheral device not shown (e.g., game controller, remote control, wearables (e.g., gloves, watch, head mounted display), AR/VR controller, stylus device, gaming pedals/shifters, or the like. A peripheral device may be referred to as an "input device," "peripheral input device," "peripheral," or the like. It should be understood that although the majority of embodiments depicted herein are focused on applications involving computer-related peripheral devices (e.g., specifically computer mices), those of ordinary skill in the art would understand how to adapt the concepts applied to non-computer related applications. FIGS. 2-4B and the corresponding description provide typical and non-limiting system block diagrams for a peripheral device, host computing device, and wireless receiver, respectively. FIG. 5-7 present examples of using the various predictive techniques described herein to both improve a power efficiency of a computer peripheral device and achieve an increased report rate. FIGS. 8-14 present examples of generating reports based on predicted movement to compensate or missing and/or corrupted reports from a computer peripheral device, and to achieve a target report rate. FIG. 16A-C show a few examples of how the predictive techniques described herein can be applied to various input elements on a number of different computer peripheral devices.

Figure 2:
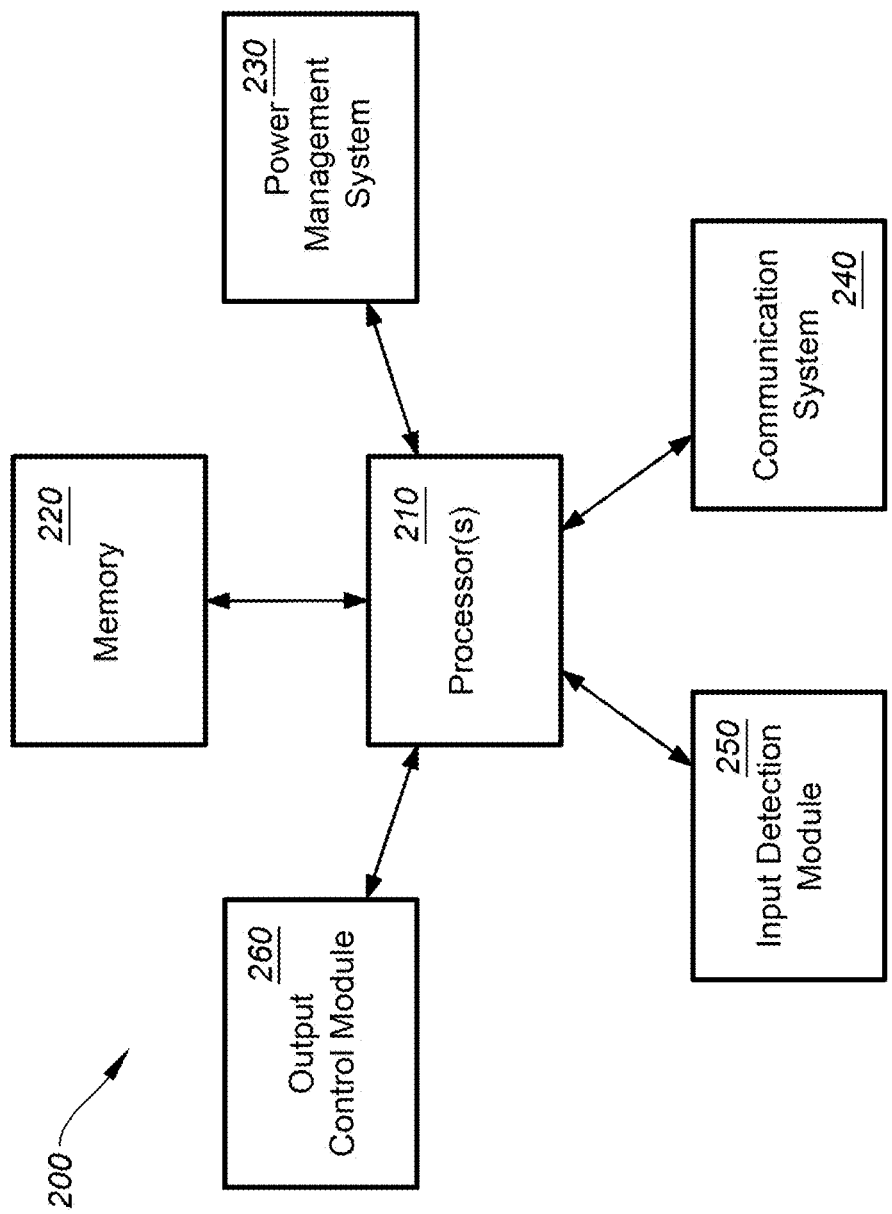
FIG. 2 shows a system for operating a peripheral input device, according to certain embodiments.

FIG. 2 shows a system 200 for operating a peripheral input device, according to certain embodiments. System 200 may be configured to operate any of the peripheral devices specifically shown and described herein (e.g., keyboard 140, mouse 130, speakers (not shown), display 120, etc.) or peripheral not shown (e.g., IoT devices) but within the wide purview of the present disclosure. System 200 may include processor(s) 210, memory 220, a power management system 230, a communication system 240, an input detection module 250, and an output control module 260. Each of the system blocks 220-260 can be in electrical communication with the processor(s) 210 (e.g., via a bus system). System 200 may also include additional functional blocks that are not shown or discussed to prevent obfuscation of the novel features described herein. System blocks 220-260 may be implemented as separate modules, or alternatively, more than one system block may be implemented in a single module. In the context described herein, system 200 can be incorporated into any peripheral device described herein and may be configured to perform any of the various methods of controlling visual output elements on one or more peripheral devices, host computing devices, or the like, as would be appreciated by one of ordinary skill in the art with the benefit of this disclosure.

In certain embodiments, processor(s) 210 may include one or more microprocessors and can be configured to control the operation of system 200. Alternatively, processor(s) 210 may include one or more microcontrollers (MCUs), digital signal processors (DSPs), or the like, with supporting hardware and/or firmware (e.g., memory, programmable I/Os, etc.), as would be appreciated by one of ordinary skill in the art. Processor(s) 210 can control some or all aspects of operation of input device 130 (e.g., system block 220-260). Alternatively or additionally, some of system blocks 220-260 may include an additional dedicated processor, which may work in conjunction with processor(s) 210. Processor(s) 210 may be local to the peripheral device (e.g., contained therein), may be external to the peripheral device (e.g., off-board processing, such as by a corresponding host computing device), or a combination thereof. As further described below, processor 302 of FIG. 3 may work in conjunction with processor 210 to perform some or all of the various methods (e.g., methods 600-900, etc.) described throughout this disclosure. One of ordinary skill in the art would understand the many variations, modifications, and alternative embodiments that are possible. Processor(s) 210 may perform any of the various functions and methods described and/or covered by this disclosure, and may operate to generate the various commands (e.g., HID commands, packetize streamed or aggregated data into reports to be sent at a report rate, etc.), in conjunction with any other resources/blocks in system 200) and corresponding functions described herein.

Memory 220 can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. In some embodiments, memory 220 may store data corresponding to inputs on the peripheral device, such as a detected movement of the peripheral device a sensor (e.g., optical sensor, accelerometer, etc.), activation of one or more input elements (e.g., buttons, sliders, touch-sensitive regions, etc.), or the like. Stored data may be aggregated and send via reports to a host computing device. In some cases, the aggregated data can be used (e.g., by a receiver 400) to computer a predicted location of the peripheral device at a later time, as further described below.

Power management system 230 can be configured to manage power distribution, recharging, power efficiency, haptic motor power control, and the like. In some embodiments, power management system 230 can include a battery (not shown), a USB based recharging system for the battery (not shown), and power management devices (e.g., voltage regulators—not shown). In certain embodiments, the functions provided by power management system 230 may be incorporated into processor(s) 210. The power source can be a replaceable battery, a rechargeable energy storage device (e.g., super capacitor, Lithium Polymer Battery, NiMH, NiCd), or a corded power supply. The recharging system can be an additional cable (specific for the recharging purpose) or it can use a USB connection to recharge the battery.

Communication system 240 can be configured to provide wireless communication with a corresponding host computing device (e.g., 105, 110, 115), or other devices and/or peripherals, according to certain embodiments. Communication system 240 can be configured to provide radio-frequency (RF), Bluetooth®, Logitech proprietary communication protocol (e.g., Unifying, Gaming Light Speed, or others), infra-red (IR), ZigBee®, Z-Wave, or other suitable communication technology to communicate with other computing devices and/or peripheral devices. System 200 may optionally comprise a hardwired connection to the corresponding host computing device. For example, input device 130 can be configured to receive a Universal Serial Bus (USB) cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 150, output control modules 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 Ghz), etc. One of ordinary skill in the art with the benefit of this disclosure would appreciate the many modifications, variations, and alternative embodiments thereof.

Input detection module 250 can control the detection of a user-interaction with input elements on input device 160. For instance, input detection module 250 can detect user inputs from motion sensors, keys, buttons, roller wheels, scroll wheels, touch pads, click wheels, dials, keypads, microphones, GUIs, touch-sensitive GUIs, image sensor based detection such as gesture detection (e.g., via webcam), audio based detection such as voice input (e.g., via microphone), or the like, as would be appreciated by one of ordinary skill in the art with the benefit of this disclosure.

In some embodiments, output control module 260 can control various outputs for a corresponding peripheral input device. For instance, output control module 260 may control a number of visual output elements (e.g., mouse cursor, LEDs, LCDs), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein.

It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as a separate entity. In addition, the inventive concepts described herein can also be applied to any peripheral device. Further, system 200 can be applied to any of the input devices described in the embodiments herein, whether explicitly, referentially, or tacitly described (e.g., would have been known to be applicable to a particular input device by one of ordinary skill in the art). The foregoing embodiments are not intended to be limiting and those of ordinary skill in the art with the benefit of this disclosure would appreciate the myriad applications and possibilities.

Figure 3:
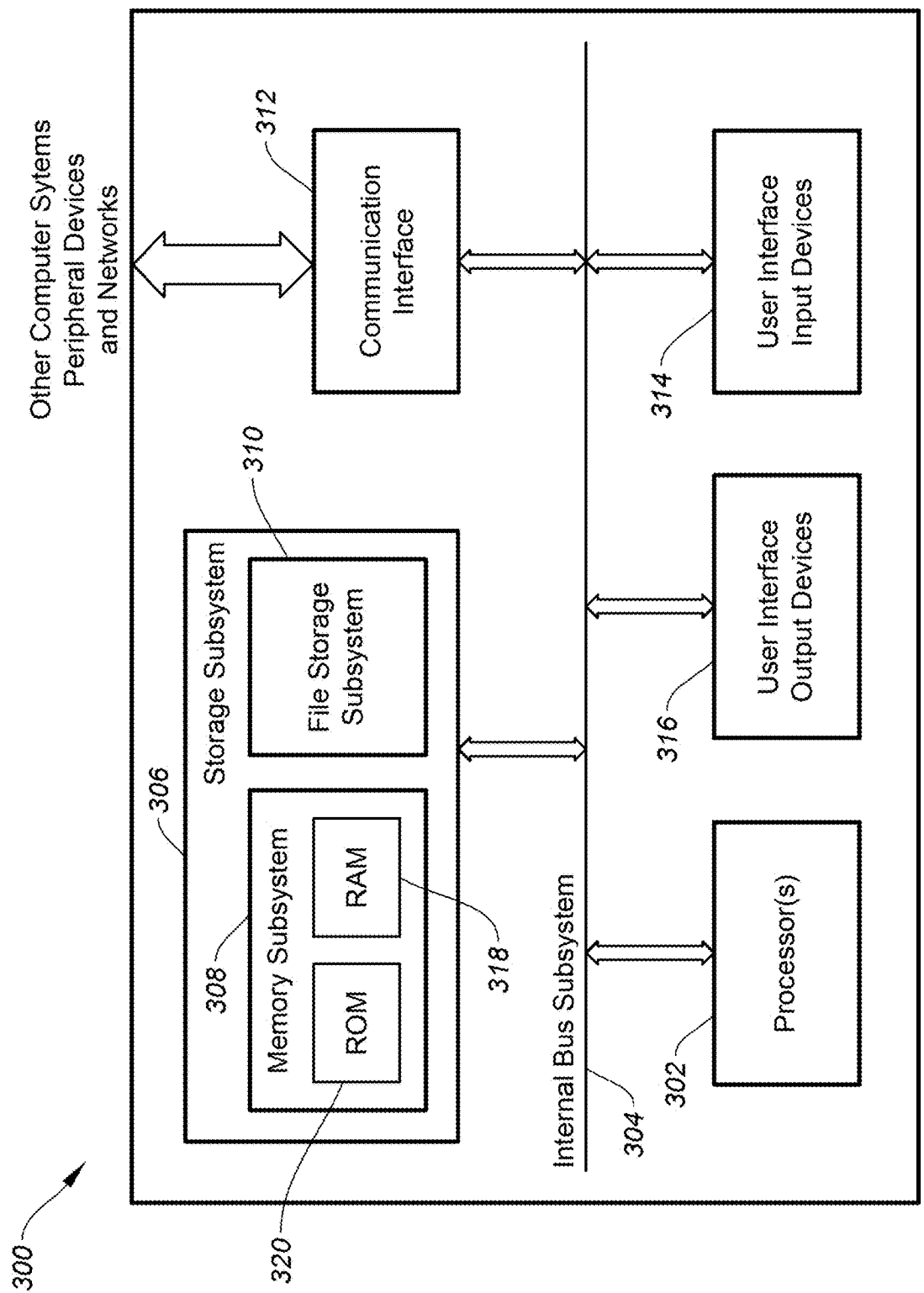
FIG. 3 is a simplified block diagram of a computing device, according to certain embodiments.

FIG. 3 is a simplified block diagram of a computing device 300, according to certain embodiments. Computing device 300 can implement some or all functions, behaviors, and/or capabilities described above that would use electronic storage or processing, as well as other functions, behaviors, or capabilities not expressly described. Computing device 300 includes a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, computing device 300 can be implemented in a host computing device, such as a desktop (e.g., desktop 150) or laptop computer, mobile device (e.g., tablet computer, smart phone, mobile phone), wearable device, media device, or the like, in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., predicting a future location of a peripheral device) may be performed by software stored in storage subsystem 306, stored in memory 420 of receiver device 400, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a computing device 300 to perform corresponding actions. The instructions may be configured to run in sequential order, in parallel (such as under different processing threads), or in a combination thereof. After loading a code module on a general purpose computer system, the general purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316

(e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Figure 4A:
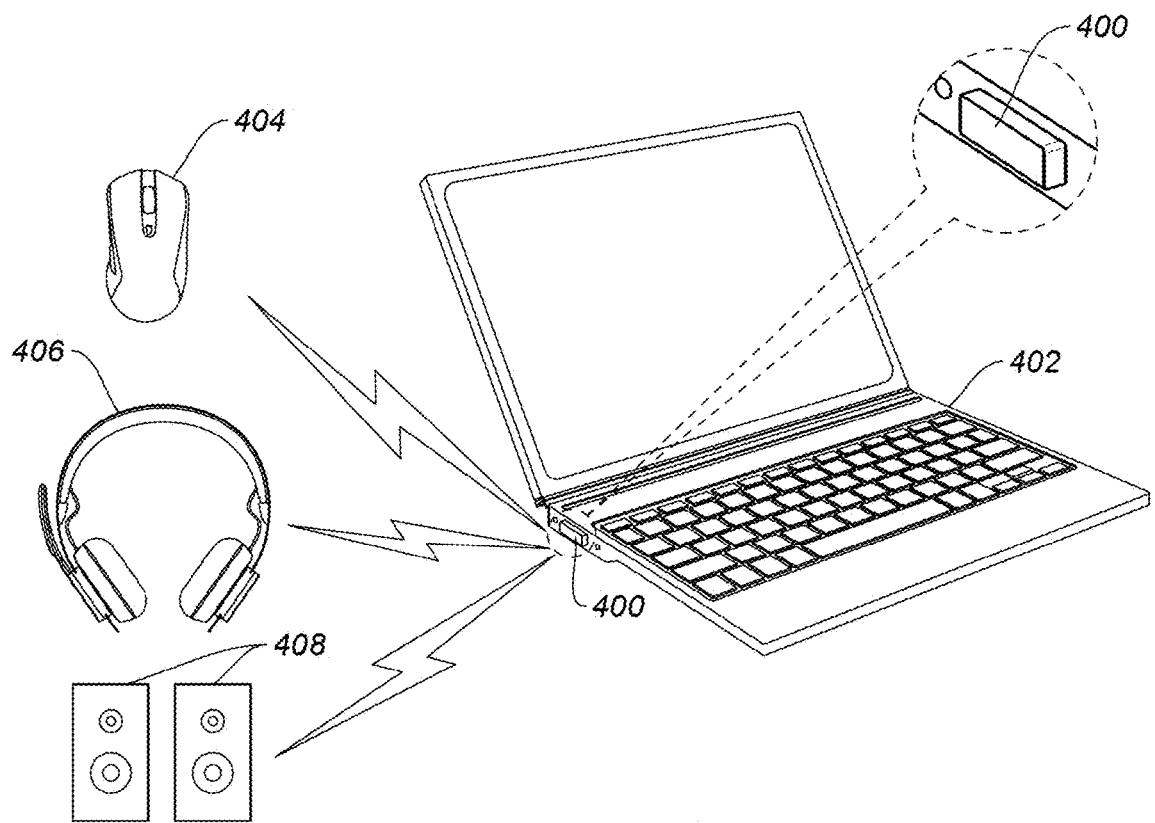
FIG. 4A shows aspects of a receiver system configured to communicatively couple a peripheral device to a host computing device, according to certain embodiments.

FIG. 4A shows aspects of a receiver system configured to communicatively and bi-directionally couple one or more peripheral devices to a host computing device, according to certain embodiments. Receiver system 400 is electrically and communicatively coupled to a host computing device 402 (e.g., laptop computer) and configured to wirelessly receive data from one or more peripheral devices, which may include a computer mouse 404, headset 406, speakers 408, or the like. Receiver system 400 is shown as a dongle that is physically coupled to a USB socket on host computing device 402, although other implementations are possible (e.g., a wireless receiver integrated with the motherboard of host computing device 402).

Figure 4B:
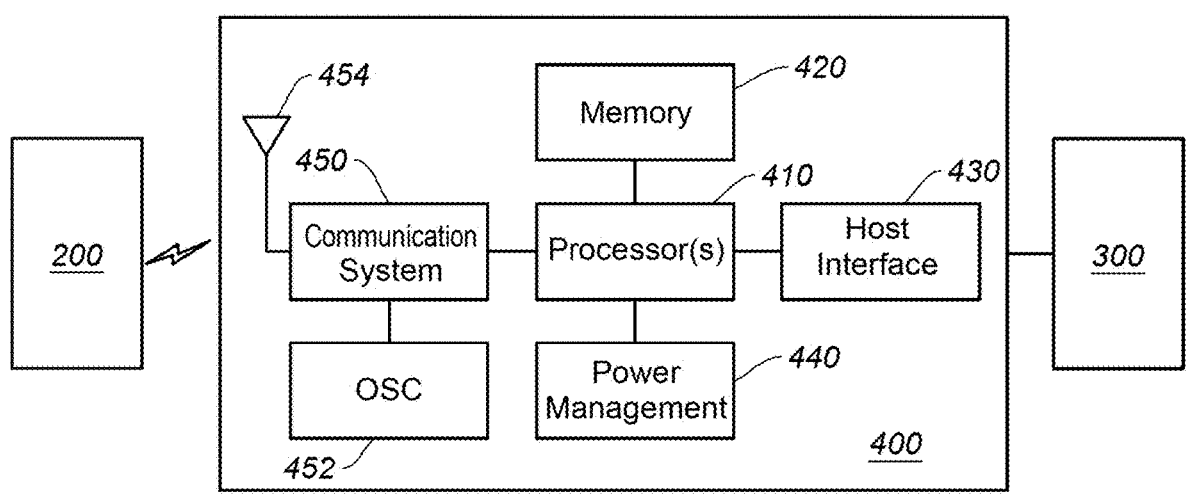
FIG. 4B shows aspects of a receiver system configured to communicatively couple a peripheral device to a host computing device, according to certain embodiments.

FIG. 4B shows a system level functional block diagram representation of how receiver 400 may operate with respect to a host computing device and one or more peripheral devices, according to certain embodiments. In some embodiments, system 200 (described above with respect to FIG. 2) may correspond to a peripheral device (e.g., compute mouse 404), system 300 (described above with respect to FIG. 3) may correspond to a host computing device (e.g., laptop 402), and system 400 may correspond to the receiver dongle shown in FIG. 4A. Receiver 400 can include one or more processors 410, memory block 420, host interface 430, power management block 440, communication system 450, oscillator 452, and antenna 454. Other components (e.g., system bus) may be included but not shown, as would be appreciated by one of ordinary skill in the art with the benefit of this disclosure.

Processor(s) 410 may include one or more microprocessors and can be configured to control the operation of system 400. Alternatively, processor(s) 210 may include one or more MCUs, DSPs, ASICs, DSPDs, PLDs, FPGAs, or other electronic units designed to perform a function or combination of methods, functions, etc., described throughout this disclosure (e.g., performing some or all aspects of methods 600-900) either of which may include supporting hardware and/or firmware (e.g., memory, programmable I/Os, etc.), as would be appreciated by one of ordinary skill in the art. Processor 410 may work in conjunction with processors 210 or 302 to perform some or all of said predictive computations (e.g., see methods 600-900) described throughout this disclosure. One of ordinary skill in the art would understand the many variations, modifications, and alternative embodiments that are possible.

Memory block 420 can store one or more software programs to be executed by processors (e.g., processor(s)

410). It should be understood that "software" can refer to sequences of instructions that, when executed by processing unit(s) (e.g., processors, processing devices, etc.), cause system 400 to perform certain operations of software programs. The instructions can be stored as firmware residing in read-only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. In some aspects, memory 420 may include instructions to perform the various aspects of location prediction further described below with respect to FIGS. 5-9.

A firmware and/or software implementation within system 400 or in conjunction with other memory resources external to system 400 may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor.

Power management system 440 can be configured to manage power distribution throughout receiver 400, manage power efficiency, and the like, and can be functionally similar to block 230 of FIG. 2. In some embodiments, power management system 230 can distribute power received via USB from host computing device 402

Communication system 450 can be configured to manage wireless communication with one or more peripheral devices 404, 406, 408, other host computing devices, or any suitable electronic device configured to communication with host computing device 402, according to certain embodiments. Communication system 450 can be configured to provide radio-frequency (RF), Bluetooth® and/or variants (e.g., BLE), Logitech communication protocol (e.g., Unifying, Gaming LightSpeed, or others), infra-red (IR), Zig-Bee®, Z-Wave, or other suitable communication technology to communicate with other computing devices and/or peripheral devices. In some aspects, communication system 450 can receive reports generated by the one or more peripheral devices (e.g., HID data, streaming or aggregated HID data, media data, etc.). Communication system 450 may incorporate one or more antennas 454, oscillators 452, etc., and may operate at any suitable frequency band (e.g., 2.4 Ghz), etc., as would be appreciated by one of ordinary skill in the art with the benefit of this disclosure.

Host interface 430 may communicate with system 300 (e.g., host computing device 402) via a USB communication protocol or other suitable interface (e.g., serial/parallel port, etc.), according to certain embodiments, as would be appreciated by one of ordinary skill in the art with the benefit of this disclosure.

Many of the embodiments described herein perform aspects of predictive location at receiver 400 using, for instance, processor(s) 410 and memory 420, as described above. However, some embodiments may perform the novel methods described herein at the peripheral device or host computing device, as would be appreciated by one of ordinary skill in the art with the benefit of this disclosure.

As described above, report rates (e.g., with HID reports) as fast as 1 ms or faster can be expected in high performance peripheral devices, which can be challenging to maintain when multiple peripheral devices (e.g., gaming grade computer mouse, keyboard, headset, speakers, etc.) are wirelessly coupled to and simultaneously sending data to the host device. Maintaining a fast report rate can pose a significant power draw for peripheral device. For example, the implementation of wireless communication for peripheral devices (e.g., computer mice) may typically be designed to account for approximately 10% of a total power draw from a local battery (e.g., power management system 230). High performance devices with fast report rates may account for up to 40% of the total power budget, which can markedly reduce battery life in these devices.

FIG. 5 is a graph 500 showing a relationship between a report rate and a maximum battery life for a peripheral device, according to certain embodiments. Graph 500 shows an inverse non-linear relationship between increasing report rates and total battery life, which illustrates the challenges presented with faster and faster report rates. For instance, for peripheral devices generating reports at 8 ms intervals, a typical battery life may be approximately 74 hours. At 4 ms, battery life may drop to approximately 68 hours. Battery life continues to drop at non-linear rates at 2 ms report rates (e.g., 60 hour battery life) and 1 ms report rates (e.g., 49 hour battery life).

Using the predictive techniques described herein, peripheral devices may submit reports (e.g., including aggregated sensor data) at slower report rates (e.g., 8 ms), which can help maintain better power dissipation characteristics, and gain the benefit of faster report rates (e.g., 1 ms) by allowing a downstream device (e.g., receiver 400 and/or host computing device 402) to compute and predict a position of the peripheral device at a later time (typically at a faster rate than the slower report rate) based on aggregated velocity and acceleration data in each received report from the peripheral device, and generate new reports using the predicted positions at the desired faster report rates. This is made possible because predictions can be made (e.g., at receiver 400) at a much faster rate than the rate that the peripheral device sends reports, and during those interim periods between reports, location predictions can be used to generate additional reports to achieve the faster report rate. In such cases, estimations can be updated and/or corrected when the next report from the peripheral device comes (e.g., 8 ms later), which can include data for the peripheral devices next current position. Thus, faster report rates at the receiver (e.g., using actual and predictive location data) can be generated based on peripheral device reports sent at slower report rates with the benefit of lower power dissipation requirements and improved battery life on the corresponding peripheral device. In some estimations, a battery life gain of a factor of 2 or more can be possible by changing the report rate and, in some cases, a polling rate of one or more sensors on a peripheral device, although other performance outcomes are possible.

There are myriad ways of implementing the predictive location techniques described herein. For example, in some embodiments, the peripheral device may always transmit data (e.g., reports) at a fixed report rate and the receiver and/or host computing device may generate the faster report rate based on the predictive techniques described above. In some cases, a user may change a mode of operation on the peripheral device (e.g., via a button) and/or software running on the host computing device (e.g., via a graphical user interface (GUI)) to switch between different reporting speeds. In such cases, either the peripheral device can change its report rate accordingly, or the receiver/host computing device can change its prediction-based report rate to a desired setting. One of ordinary skill in the art with the benefit of this disclosure would appreciate the many modifications, variations, and alternative embodiments thereof.

FIG. 6 is a swim lane diagram showing aspects of a method 600 of predicting a displacement of a peripheral device to achieve an increased report rate and lower power dissipation, according to certain embodiments. Method 600 can be performed by processing logic that may comprise hardware (circuitry, dedicated logic, etc.), software operating on appropriate hardware (such as a general purpose computing system or a dedicated machine), firmware (embedded software), or any combination thereof. For instance, aspects of method 600 performed by computer peripheral device 404, receiver 400, and host computing device 402 may be performed by processors 210, 410, and 302 respectively. In the embodiment that follows, a peripheral device generates and sends a report at a report rate of 3 ms. The report typically includes an aggregated batch of sensor data, which may include displacement data (e.g., from an optical sensor, accelerometer, Hall effect sensor, etc.) corresponding to a physical movement of the peripheral device in physical space (e.g., 2D movement along an underlying surface, in-air 3D movement, etc.), movement of a control element (e.g., a scroll wheel on a mouse) or other type of movement, as would be appreciated by one of ordinary skill in the art with the benefit of this disclosure. A receiver then receives the report and during the period (e.g., 3 ms) between subsequent reports from the peripheral device, the receiver can use the sensor data to determine a present trajectory and predict a future position or positions of the peripheral data at later intervals (typically faster than the peripheral device report rate) until the next report comes and the receiver can get the next actual position from the next batch of aggregated sensor data and correct any inaccuracies in the current predicted location of the peripheral device. In the embodiment of FIG. 6, the receiver intercepts the report and generates a new report based on a predicted position approximately 1 ms later and sends the new report to the host computing device. The receiver can do this repeatedly to effectively provide a report to the host computing device at a 1 ms report rate and may correct any error in the actual location of the peripheral device when the receiver gets the next report (e.g., every 3 ms) from the peripheral device. Note that the particular embodiments presented in FIG. 6 shows how a 3 ms report rate can be effectively increased to a 1 ms report rate by way of the predictive calculations described above, however other rates are possible. For instance, some embodiments may have 8 ms report rates from the peripheral device and 1 ms report rates from the receiver. Note that greater time differentials between the receiver's actual versus predicted location reporting may be proportional to an amount of error, such that an 8 ms to 1 ms increase via the predictive techniques described above may yield markedly improved power dissipation characteristics, however the error in the predicted vs. actual location may be greater than other embodiments with a 3 ms to 1 ms increase, as would be appreciated by one of ordinary skill in the art with the benefit of this disclosure.

Referring back to FIG. 6, at operation 610, method 600 begins with computer peripheral device (CPD) 404 receiving sensor data, aggregating the sensor data, generating an initial report (A1) based on the aggregated sensor data, and submitting the report A1 to a receiver 400 via a wireless communications protocol (e.g., Bluetooth® or variants, Logitech Unifying, Logitech LightSpeed, IR, NFC, RF, or the like). Sensor data can be received at any suitable rate, typically ranging from 1 ms (1 kHz—a relatively slow rate) to 58 μs (17 kHz—a relatively fast rate), however faster report rates are possible, which can be preferable for computing velocity and acceleration trends. Typically, a microcontroller (e.g., processor 210) in the input device (e.g., computer mouse 130) reads the displacement in an optical sensor (or other suitable movement tracking sensor) at an interval defined by the input device firmware, as would be appreciated by one of ordinary skill in the art with the benefit of this disclosure. Typical sensor may be optical sensors (e.g., for measuring movement of a computer mouse along an underlying surface), an inertial measurement unit and/or external tracking systems, such as lighthouses for tracking movement in 3D space, magnetic sensors (e.g., Hall sensors), and resistive sensors (e.g., potentiometers) for measuring scroll wheel rotation.

At operation 612, receiver 400 receives the report A1 from CPD 404, analyzes the aggregated sensor data, determines a present location of CPD 404 and/or computes a trajectory of CPD 404 (e.g., based on velocity and acceleration data of CPD 404), predicts a future displacement of CPD 404, generates a substitute report B1 (e.g., with a current location of CPD 404 and a predicted location(s) of CPD 404 at future time intervals), and sends report B1 to a host computer device (HCD) 402. As shown in FIG. 4A, receiver 400 may be physically coupled to HCD 402 via USB port or other suitable hardwired or wireless communication protocol. At operation 613, HCD 402 receives report B1 and uses data therein to control an element (e.g., a cursor) on a display. Note that cursor control is but one embodiment and reports from CPD 404 can be configured to control any suitable aspect of HCD 402, as would be appreciated by one of ordinary skill in the art with the benefit of this disclosure.

At operation 614, receiver 400 may generate a second substitute report B2 based on the predicted future displacement of CPD 404 performed at operation 612. At operation 615, HCD 402 receives report B2 and controls the element on the display therewith. At operation 616, receiver 400 may generate a third substitute report B3 also based on the computed future displacement of CPD 404 performed at operation 612, i.e., the latest report from CPD 404. At operation 617, HCD 402 receives report B3 and uses data therein to control the element on the display. In FIG. 6, receiver 400 is shown to submit reports to HCD 402 at 1 ms intervals, while CPD 404 submits reports to receiver 400 at 3 ms intervals. Receiver 400 can submit report B2 to HCD 402 at any suitable interval. Typically, displacement computations and trajectory predictions can be performed at substantially faster rates than report rates (e.g., greater than one order of magnitude), and can often be performed at sub-micro second rates (e.g., 50-500 μs). As such, substitute reports that include trajectory calculations and predicted displacement may be sent at report rates that are faster than the reports received from CPD 404. In order to maintain an operating specification of a 1 ms report rate, receiver 400 uses the predicted displacement data to generate and send substitute reports at that rate, however faster (e.g., 500 μs) or slower (e.g., 2 ms) report rates are possible. One of ordinary skill in the art with the benefit of this disclosure would appreciate the many modifications, variations, and alternative embodiments thereof.

At operation 620, method 600 continues with CPD 404 receiving new sensor data e.g., aggregating the new sensor data, generating a next report (A2) based on the aggregated sensor data, and submitting the report A2 to receiver 400. At operation 622, receiver 400 receives report A2 from CPD 404, analyzes the aggregated sensor data, calculates a current trajectory of CPD 404 based on the aggregated sensor data, predicts an updated future displacement of CPD 404, generates a substitute report B4, and sends report B4 to HCD 402. At operation 623, HCD 402 receives substitute report B4. Note that receiver 400 may correct or improve an error introduced in a previously predicted displacement of CPD 404 (e.g., determined at operation 616) using each new set of aggregated sensor data (i.e., the actual movement data) being received at 3 ms intervals (e.g., operations 610, 620, 630). At operation 624, receiver 400 may generate a substitute report B5 based on the predicted future displacement of CPD 404 performed at operation 622. At operation 625 HCD 402 receives report B5 and controls the element on the display therewith. At operation 626, receiver 400 may generate a substitute report B6 based on the predicted future displacement of CPD 404 performed at operation 622. At operation 627 HCD 402 receives report B6 and controls the element on the display therewith. The method may continue such that CPD 404 continues to generate and send reports at a 3 ms report rate, and receiver 400 may continue to intercept said reports, and send new reports to HCD 402 at 1 ms intervals that can include an actual and predicted trajectory of CPD 404, thereby achieving a 1 ms report rate from a peripheral device reporting at 3 ms intervals.

FIG. 7 is a simplified flow chart showing aspects of a method 700 for predicting a displacement of a peripheral device to achieve an increased report rate and lower power dissipation, according to certain embodiments. Method 700 can be performed by processing logic that may comprise hardware (circuitry, dedicated logic, etc.), software operating on appropriate hardware (such as a general purpose computing system or a dedicated machine), firmware (embedded software), or any combination thereof. For instance, aspects of method 700 can be performed by processor 210 of CPD 404 (e.g., operations 710-730) and processor 410 of receiver 400 (e.g., operations 740-790). In some embodiments, operations 740-790 may be performed by a host computing device, one or more networked computing devices, computing resources on the cloud, or the like, as would be appreciated by one of ordinary skill in the art with the benefit of this disclosure.

At operation 710, method 700 can include controlling, by one or more processors, a motion sensor (e.g., optical sensor) disposed on a computer peripheral device, the motion sensor configured to generate movement data at intervals, the movement data corresponding to a tracked movement of the computer peripheral device with respect to an underlying surface, according to certain embodiments. Alternatively or additionally, other sensors can be controlled on any suitable computer peripheral device to generate corresponding sensor data. The computer peripheral device can be a computer mouse, virtual/augmented reality controller, remote control, game controller, or the like. Sensor data may correspond to a displacement of the computer input device along an underlying surface (e.g., as presented in the non-limiting embodiment of FIG. 7), movement in 3D space, or the like. Sensor data can come from any suitable type of sensor including an optical sensor (e.g., to detect 2D movement along a surface), Hall-type sensor (e.g., to detect a rotation of a scroll wheel using magnetic fields), inertial measurement unit (e.g., to detect acceleration, movement in 3D space), accelerometer, gyroscope, or the like. Although the embodiment of FIG. 7 relates closely to a computer mouse and corresponding sensors, one of ordinary skill in the art with the benefit of this disclosure would appreciate the many options, modifications, variations, and alternative uses with respect to sensor types and computer peripheral devices.

At operation 720, method 700 can include aggregating, by the one or more processors, a plurality of intervals of movement data (e.g., from the optical sensor data) into a first report, according to certain embodiments. Alternatively or additionally, acceleration data from one or more additional sensors (e.g., IMU) may be included and aggregated in the first report. Each interval of the plurality of intervals may correspond to each set of sensor data generated by the sensor and sent to the one or more processors. For example, an optical sensor may send multiple sets of movement data to the one or more processors over a period of time, where the time between each set of movement data that is sent may correspond to an interval.

At operation 730, method 700 can include sending, by the one or more processors, the first report to a receiver coupled to a host computing device, according to certain embodiments. In some aspects, the first report can be sent via a wireless communications protocol at a first report rate (e.g., 3-8 ms) that is slower than a rate of each interval of generated movement data (e.g., <1 ms, in some cases less than 100 µs.

At operation 740, method 700 can include receiving the first report by the receiver coupled to the host computing device, according to certain embodiments. Typically, the first report is intercepted and later replaced with a second report (see, e.g., operation 780) as further described below. However some embodiments may pass the first report to the host computing device (e.g., every 8 ms) along with a second report (e.g., every 1 ms) to provide predictions for future displacement for the computer peripheral device, and software on the host computing device may use both reports to determine a position of the computer peripheral device. One of ordinary skill in the art with the benefit of this disclosure would appreciate the many modifications, variations, and alternative embodiments thereof.

At operation 750, method 700 can include computing, by the receiver, a current velocity and acceleration of the computer peripheral device based on the plurality of intervals of movement data in the first report, according to certain embodiments. The plurality of intervals of movement data can include a succession of data showing a movement of the computer peripheral device, which can be analyzed and integrated for instance to determine the velocity and/or acceleration from position data. In some cases, movement data may include IMU data, as noted above, which can provide acceleration data that may be used to determine/supplement velocity and acceleration calculations. In some embodiments, only the velocity may be computed and it may be assumed that the acceleration is zero during a short time interval. Thus, in the various embodiments described herein, it can be assumed that computing the acceleration may be an optional step.

At operation 760, method 700 can include predicting, by the receiver, a trajectory of the computer peripheral device based on the first report, according to certain embodiments. As described above, the first report may include an aggregated set of data including movement data over a period of time. The prediction of the computer peripheral device's trajectory, including future positions, velocity, and acceleration can be made with varying levels of accuracy depending on the amount of data being used for the prediction, and how far out the prediction is being made (e.g., 1 ms, 2 ms, 5 ms, etc.). For example, calculations using relatively large amounts of movement data (e.g., 10+ data points) to predict a future position relatively close in time (e.g., 1 ms) are likely to be more accurate than calculations using relatively small amounts of movement data (e.g., <3 data points), as would be appreciated by one of ordinary skill in the art with the benefit of this disclosure. In the example of FIG. 6, movement predictions are made 2 ms out before the next set of movement data is received, including the next set of actual movement data (e.g., based on sensor data), which can be used to correct prediction errors in the intervening calculations between reports from the computer peripheral device. In certain embodiments, a state estimator (e.g., operating on the receiver) can be used for predicting the trajectory of the computer peripheral device. The state estimator may be a linear state estimator, may include a Kalman filter (KF), or an extended Kalman filter (EKF) configured to incorporate an estimated error to balance error correction of the computed current velocity and acceleration of the computer peripheral device, or other method of estimation, as would be appreciated by one of ordinary skill in the art with the benefit of this disclosure. Typically, between 1 and 5 intervals of movement data may be aggregated, with one interval typically being used for basic velocity estimations, two intervals for improved velocity and basic acceleration estimations, and more for further improved velocity and acceleration estimations. In some embodiments, movement data may be encoding a displacement during an interval of time (e.g., a velocity), such that sensors may report velocity rather than position.

In some aspects, machine learning can be used to supplement the predictions by incorporating learned patterns of movement behavior (e.g., in clerical or gaming applications). More specifically, machine learning (ML) can be used to compute the error correction for a specific user, for example. Similar to graphology for signatures, a user's hand controlling mouse movement will be specific to the user in a particular biometric manner. Machine learning can be trained to minimize the trajectory error by applying a correction factor to the computed predictive trajectory. Alternatively or additionally, ML can be trained to predict a future trajectory and motion intervals for specific users. Since the optical sensor and the mouse can send the ground truth trajectory regularly at a lower report rate, ML can be used to minimize the error of the predicted trajectory after a certain time of training. Machine learning would typically run on either the receiver 400 or host computer 402. By way of example, for a certain period of time, an ML algorithm could be configured in training mode where the sensor data is sent at a high report rate to the receiver and the receiver uses this data to compute the ground truth trajectory. In parallel, the receiver can aggregate a plurality of reports to compute a simulated lower report rate data, then the receiver can use this lower report rate data as an input of the predictive algorithm. The receiver can then compute the error between the simulated predictive trajectory and the ground truth trajectory. Then, the receiver can train the machine learning algorithm to minimize this trajectory error. After a certain period of time, the ML algorithm may exit the training mode, and can use the trained error correction to further improve the predictive algorithm.

At operation 770, method 700 can include computing, by the receiver, a future incremental displacement of the computer peripheral device based on the predicted trajectory, according to certain embodiments. The incremental displacement may be made at any succession of intervals (e.g., 1 ms, 2 ms, 3 ms, 5 ms, etc.) over any period of time (e.g., 5 ms out). In some aspects, the incremental displacement and/or the period of time may be dictated, at least in part, by the frequency at which new actual position data (e.g., sensor data) is received (included in each report from the computer peripheral device), which can be used to update and correct a current predicted location, velocity, and/or acceleration of the computer peripheral device.

At operation 780, method 700 can include generating, by the receiver, a second report that includes the computed current velocity (and optionally the acceleration) of the computer peripheral device and the computed future incremental displacement of the computer peripheral device, according to certain embodiments. The second report replaces the first report, which is typically intercepted by the receiver, however some embodiments may still pass the first report to the host computing device in the manner described above with respect to operation 740.

At operation 790, method 700 can include sending, by the receiver to the host computing device, according to certain embodiments. In some cases, the second report rate (e.g., typically 1-2 ms intervals or faster) can be faster than the first report rate (e.g., typically 2-10 ms intervals or slower).

It should be appreciated that the specific steps illustrated in FIG. 7 provide a particular method 700 for predicting a displacement of a peripheral device to achieve an increased report rate and lower power dissipation, according to certain embodiments. Other sequences of steps may also be performed according to alternative embodiments. Furthermore, additional steps may be added or removed depending on the particular applications. For example, although a single report interception (e.g., first report) and generation (e.g., second report) is described in the present method, it would be understood by those of ordinary skill in the art with the benefit of this disclosure that the predictive reporting occurs repeatedly at any suitable rate or duration. For example, the method may further include receiving, by the receiver coupled to the host computing device, a third report including an aggregation of a next plurality of intervals of movement data, the third report received after the first and second reports; updating the computed current velocity (and optionally the acceleration) of the computer peripheral device based on the third report; predicting the trajectory of the computer peripheral device based on the third report; and sending, by the receiver to the host computing device, the third report at the second report rate. In some embodiments, method 700 can further include controlling, by the one or more processors, an IMU on the computer peripheral device, the IMU configured to generate acceleration data corresponding to the tracked movement of the computer peripheral device with respect to the underlying surface. As described above, any suitable peripheral computing device may be used, however in many embodiment the peripheral computing device may be a computer mouse, and the receiver may be a USB dongle physically and communicatively coupled to the host computing device. In some aspects, the second report rate can have a lower power requirement than the first report rate, as further described above at least with respect to FIG. 5. Any combination of changes can be used and one of ordinary skill in the art with the benefit of this disclosure would understand the many variations, modifications, and alternative embodiments thereof.

In the previous embodiments, the predictive techniques described herein were presented as a way to improve power characteristics of a computer peripheral device and to potentially and markedly enhance battery life, which can be an important feature in today's competitive market. However, in some implementations, movement prediction may be used to supplement and, in some cases, replace reports to deal with deleterious effects often encountered in wireless communications including interference, jitter, or the like. In such cases, the predictive techniques described herein may be used to maintain a particular report rate (e.g., 1 ms report rate) by sending a generated report with a predicted movement of the computer peripheral device when a report is not available (e.g., lost or corrupted packets) to help prevent the report rate from dropping below a target rate. For example, a computer peripheral device may generate report rates at 1 ms, which includes actual movement data from the computer input device. In some aspects, the predictive techniques described herein may be employed only when the report is missing to ensure a consistent delivery at the host computing device at the 1 ms specification, as further describe below with respect to FIG. 8. In such cases, the next report with actual position data can be used to correct the predicted location (e.g., with a state estimator to reduce error). In some embodiments, a motivation to employ the predictive techniques described herein may be to simply increase the effective report rate when battery life is not a concern (e.g., wireless devices with a continuous/periodic power source, such as a from a powered mouse pad).

Kalman filtering, also known as linear quadratic estimation, can include the use of a series of measurements observed over time, containing statistical noise and other inaccuracies, and produces estimates of unknown variables that tend to be more accurate than those based on a single measurement alone, by estimating a joint probability distribution over the variables for each timeframe. Kalman filtering typically works as a two-step process. In a prediction step, the Kalman filter produces estimates of the current state variables, along with their uncertainties. Once the outcome of the next measurement (typically corrupted with some amount of error, including random noise) is observed, these estimates are updated using a weighted average, with more weight being given to estimates with higher certainty. Kalman filtering may be recursive. It can run in real time, using the present input measurements and the previously calculated state and its uncertainty matrix and no additional past information may be necessary. Typically, using a Kalman filter assumes that the errors are Gaussian.

Figure 8:
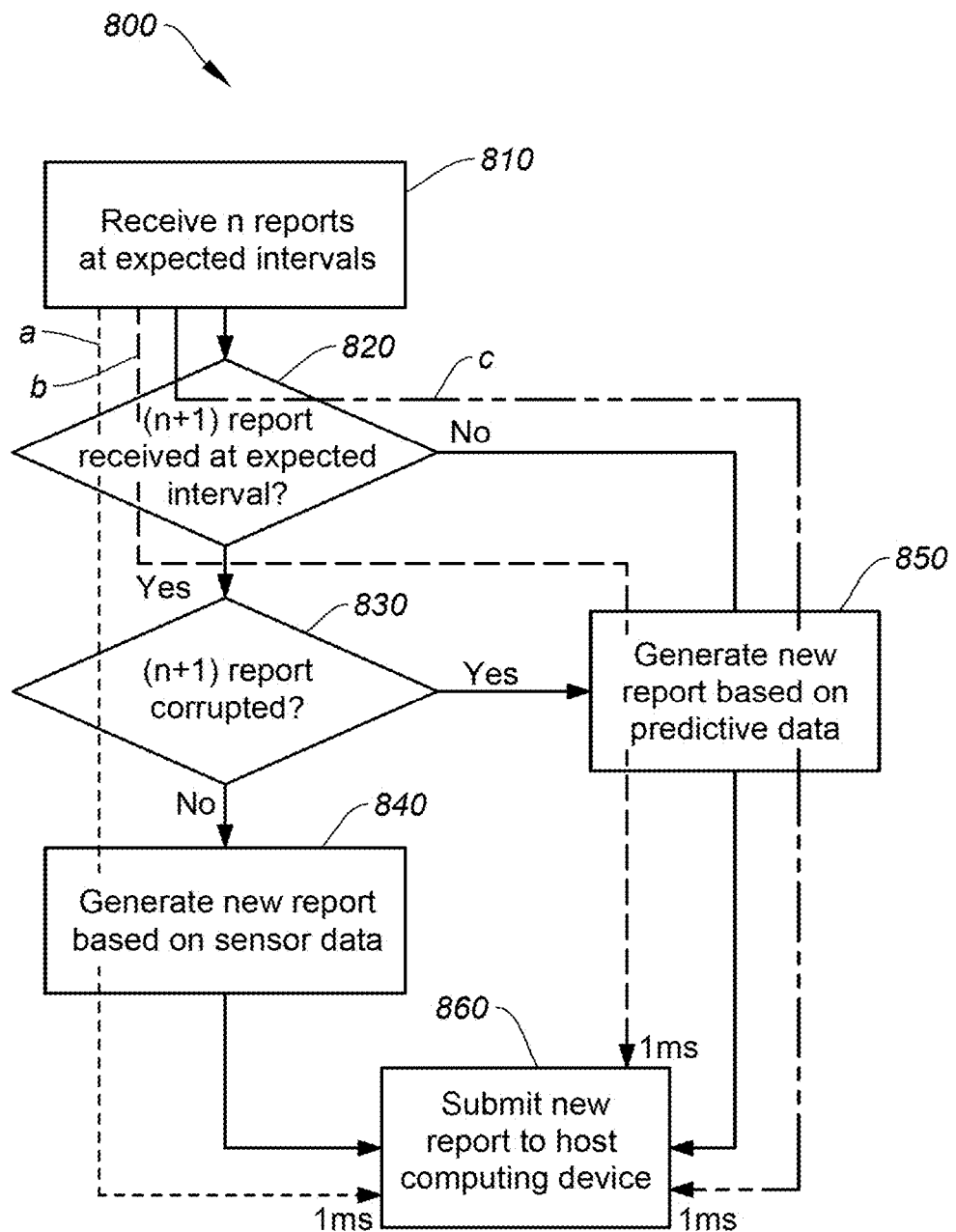
FIG. 8 is a simplified flow chart showing aspects of a method for predicting a displacement of a peripheral device to achieve a target report rate, according to certain embodiments.

FIG. 8 is a simplified flow chart showing aspects of a method 800 for predicting a displacement of a peripheral device to achieve a target report rate, according to certain embodiments. Method 800 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 800 can be performed by receiver 400. Alternatively or additionally, method 800 may be performed by aspects of system 200, 300, 400, or a combination thereof. In summary, method 800 may be performed by a receiver, a host computing device, one or more networked computing devices, computing resources on the cloud, or the like, as would be appreciated by one of ordinary skill in the art with the benefit of this disclosure.

At operation 810, method 800 can include receiving n reports at expected intervals, according to certain embodiments. For instance, a receiver 400 may expect to receive a succession of reports from a computer peripheral device 404 at 1 ms intervals. In some aspects, the reports are intercepted and later replaced with new reports (see, e.g., operation 860). However, certain embodiments may send both to the destination device (e.g., host computing device 402). One of ordinary skill in the art with the benefit of this disclosure would appreciate the many modifications, variations, and alternative embodiments thereof.

At operation 820, method 800 can include determining whether a next consecutive (n+1) report has been received during the expected interval, according to certain embodiments.

At operation 830, if the (n+1) is received within a designated window (e.g., within a 1 ms interval), method 800 may proceed with determining whether the (n+1) report is corrupted, according to certain embodiments. For instance, some reports may contain corrupted packets (e.g., containing indecipherable or unusable data).

At operation 840, if the (n+1) report is received at the expected interval and is not corrupted, method 800 can include generating a new report based on the sensor based on sensor data, according to certain embodiments. That is, because the report is received on time and is intact, the actual position data (e.g., based on the present and most up-to-date aggregated sensor data) from the computer peripheral device can be used to generate a report.

At operation 860, method 800 can include submitting the newly generated report to the host computing device, according to certain embodiments. In some embodiments, the new report may replace the intercepted (n+1) report received at operation 810. In further embodiments, the new report may supplement the (n+1) report.

At operation 820, if the (n+1) report is not received at the expected interval, method 800 can include generating a new (n+1) report based on predictive data, according to certain embodiments (operation 850). As described above, a predicted position, velocity, and/or acceleration of the computer peripheral device can be calculated based on the aggregated sensor data. Thus, a new report (n+1) with predicted movement data for the computer peripheral device will be sent in place of the missing (n+1) report. The new report is then submitted to the host computing device (operation 860).

At operation 830, if the (n+1) report is corrupted, method 800 can include generating a new (n+1) report based on predictive data, according to certain embodiments (operation 850). Thus, a new report (n+1) with predicted movement data for the computer peripheral device will be sent in place of the corrupted (n+1) report. The new report is then submitted to the host computing device (operation 860).

Note that each path can still yield a target report rate regardless of the state of the (n+1) report. For example, path a after operation 810 generates a new report based on the present up-to-date movement data at a 1 ms report rate. Paths b and c, despite the inclusion of prediction-based movement data, can still submit the new report to the host computing device at the 1 ms report rate target. Note that the various embodiment described herein refer primarily to reports including movement data. It would be understood by those of ordinary skill in the art that reports can also include other types of data (e.g., HID commands, etc.) and in no way limits the possibilities and implementations of the predictive techniques described herein.

It should be appreciated that the specific steps illustrated in FIG. 8 provide a particular method 800 for predicting a displacement of a peripheral device to achieve a target report rate, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

In some embodiments, a movement (trajectory) prediction may depend on one or multiple reports previously received (e.g., velocity data, acceleration data, change of angle data, etc.) sent by the device as explained above with respect to method 700. Typically, velocity data may be first degree data (e.g., highest priority), followed by acceleration data (e.g., second degree data—lower priority than velocity data), then change-of-angle data (third degree data—lower in priority than velocity and acceleration data). The movement prediction may be based on multiple type of movement data (e.g., degrees 1-3), including data going back for longer periods of time. However, predictions based on periods of time greater than 8 ms may be noticeable to discerning users. A simple predictive method based on the latest report received may be predicted using a basic formula:

$$\sum_{1}^{n} 1 / \left(\frac{x}{2n}\right)$$

Figure 11:
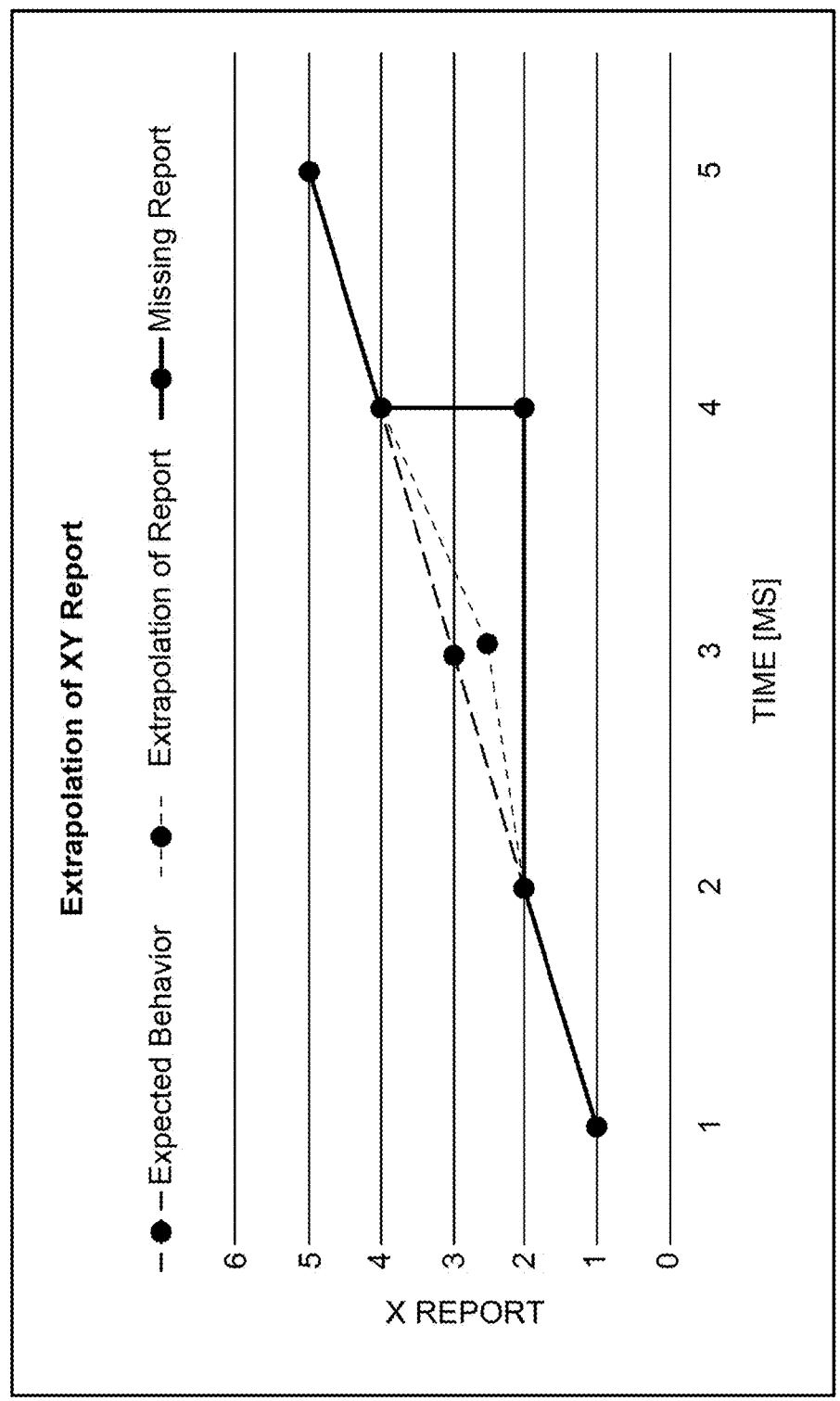
FIG. 11 shows a graph 1100 depicting an extrapolation of an XY report for a computer peripheral device, according to certain embodiments.

Thus, in cases where one report is missing, the added values may be calculated by using 1/(x/2), as represented by graph 1100 of FIG. 11, which shows a number of reports versus time for three scenarios including when there is a missing report, an expected report rate (e.g., based on the previous rate of reporting), and the extrapolation of the report rate (e.g., calculated behavior). By extension, if more samples are missing, additional reports may be represented as shown in the second equation below depending on the number of reports that are missing (the second equation shows that at least three reports are missing):

$$\sum 1 / \left(\left(\frac{x}{2}\right) + \left(\frac{x}{4}\right) + \left(\frac{x}{8}\right) + \ldots \left(\frac{x}{2n}\right)\right)$$

Other methods of prediction using different formulas, constants, error correction, and the like, may be incorporated, as would be appreciated by one of ordinary skill in the art with the benefit of this disclosure.

Figure 9:
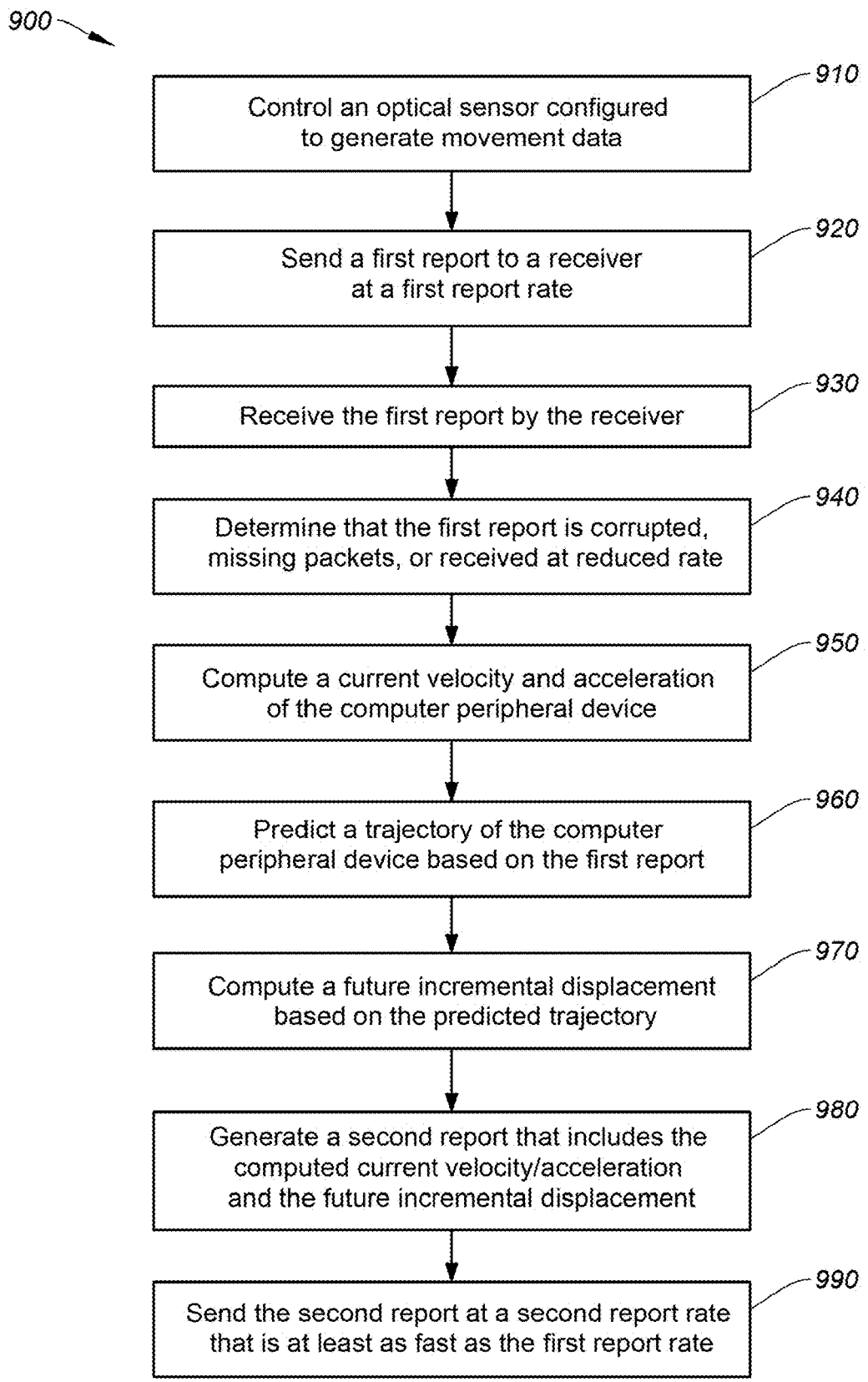
FIG. 9 is a simplified flow chart showing aspects of a method for predicting a displacement of a peripheral device to achieve a target report rate, according to certain embodiments.

FIG. 9 is a simplified flow chart showing aspects of a method 900 for predicting a displacement of a peripheral device to achieve a target report rate, according to certain embodiments. Method 900 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 900 can be performed by receiver 400. Alternatively or additionally, method 900 may be performed by aspects of system 200, 300, 400, or a combination thereof.

At operation 910, method 900 can include controlling, by one or more processors, a motion sensor (e.g., optical sensor) disposed on a computer peripheral device, according to certain embodiments. The motion sensor may be configured to generate movement data at intervals, the movement data corresponding to a tracked movement of the computer peripheral device with respect to an underlying surface.

At operation 920, method 900 can include sending, by the one or more processors, a first report to a receiver coupled to a host computing device at a first report rate, according to certain embodiments. In some aspects, the first report can include one or more intervals of generated movement data, the first report being sent via a wireless communications protocol, At operation 930, method 900 can include receiving the first report by the receiver, according to certain embodiments.

At operation 940, method 900 can include determining, by the receiver, that the first report is corrupted or received at a rate slower than the first report rate, according to certain embodiments.

At operation 950, method 900 can include computing, by the receiver, a current velocity of the computer peripheral device based on the one or more intervals of movement data in the first report, according to certain embodiments. In some embodiments, the acceleration is optional and may not be computed, e.g., and may be assumed to be equal to zero during a short time interval (e.g., 1 ms or other suitable interval).

At operation 960, method 900 can include predicting, by the receiver, a trajectory of the computer peripheral device based on the first report, according to certain embodiments.

At operation 970, method 900 can include computing, by the receiver, a future incremental displacement of the computer peripheral device based on the predicted trajectory, according to certain embodiments.

At operation 980, method 900 can include generating, by the receiver, a second report that includes the computed current velocity (and optionally the acceleration) of the computer peripheral device and the computed future incremental displacement of the computer peripheral device, according to certain embodiments.

At operation 990, method 900 can include sending, by the receiver to the host computing device, the second report at a second report rate that is at least as fast as the first report rate, according to certain embodiments.

It should be appreciated that the specific steps illustrated in FIG. 9 provide a particular method 900 for predicting a displacement of a peripheral device to achieve a target report rate, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

In some of the previous embodiments described above, predictive analysis has been used to improve power efficiency or to maintain a report rate when reports are received at inconsistent intervals or with corrupted data. Power efficiency may be improved by allowing the computer peripheral device to operate with a lower sensor polling rate, lower report rate, or both continuously, conditionally (e.g., when battery levels fall below a threshold value (e.g., 50%)), or intermittently (e.g., based on usage, further described below). Maintaining a report rate may be important to guarantee a certain performance (e.g., 1 ms report rate) even when receiving inconsistent reports. The predictive analysis may be performed at a receiver (e.g., wireless dongle), a host computing device, other devices/resources on a network, on the cloud via an internet connection, or the like.

In some embodiments, predictive analysis may be used to dynamically control the operation of a computer peripheral device. More specifically, a report rate of a computer peripheral device may be dynamically controlled based on its usage. For example, when the computer peripheral device is determined to be operating relatively slowly (e.g., below a threshold velocity, acceleration, or angle of movement) or it is determined that the computer peripheral device is operating software on the host computing device that does not require high performance (e.g., a word processing application), then a receiver (or host computing device, cloud computing entity, network entity, etc.) can generate and send a command to the computer peripheral device causing it to operate at a reduced report rate (e.g., 4-10 ms report rate or slower, reduced sensor polling rate, or other reduction). Conversely, when the computer peripheral device is operating relatively quickly (e.g., at or above a threshold velocity, acceleration, or angle of movement) or it is determined that the computer peripheral device is operating software on the host computing device that does require high performance (e.g., e-sports games), then a receiver (or host computing device, cloud computing entity, network entity, etc.) can generate and send a command to the computer peripheral device causing it to operate at an increased report rate (e.g., 1 ms report rate or faster, increased sensor polling rate, or other performance enhancement).

Figure 10:
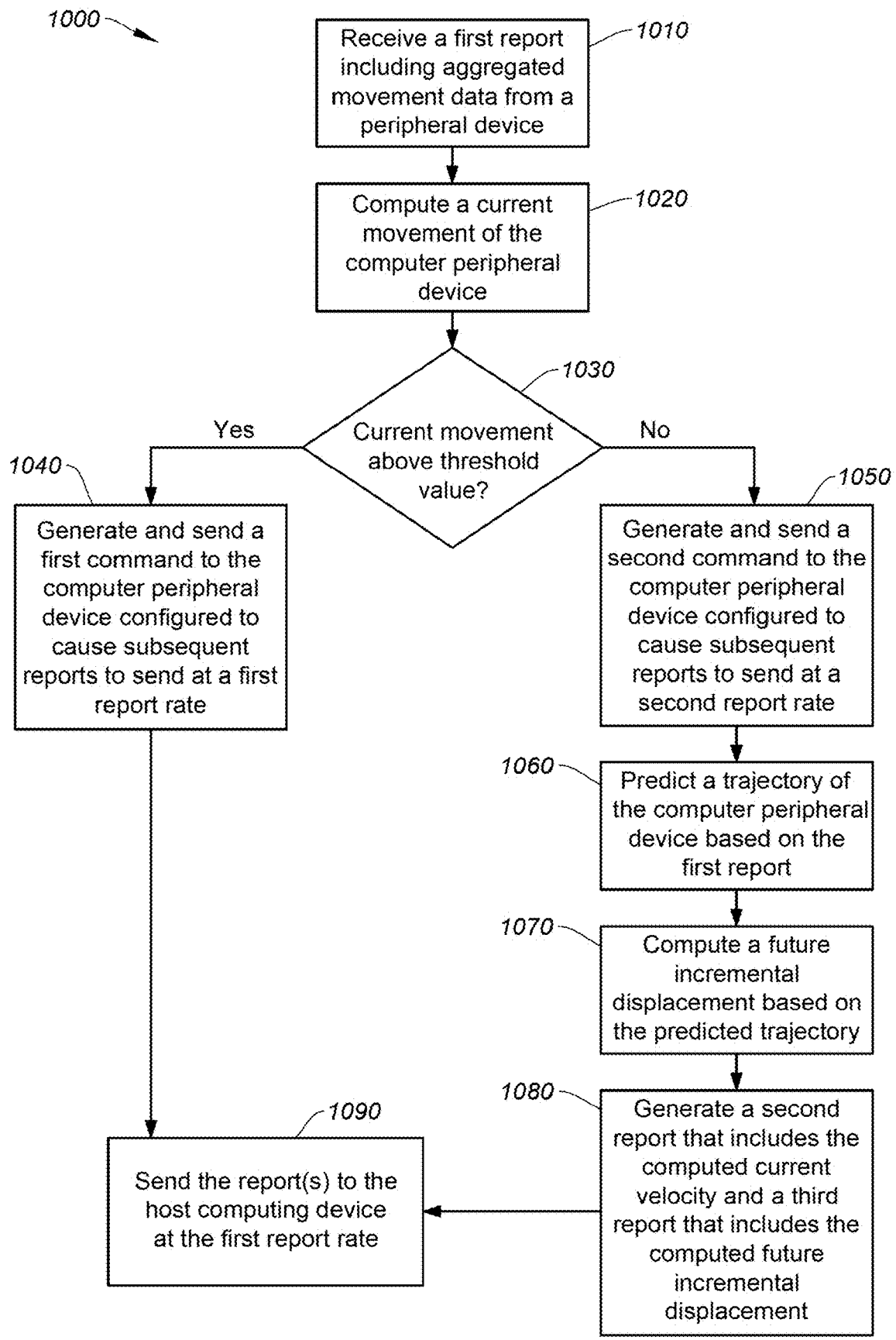
FIG. 10 is a simplified flow chart showing aspects of a method for dynamically controlling a report rate on a computer peripheral device, according to certain embodiments.

FIG. 10 is a simplified flow chart showing aspects of a method 1000 for dynamically controlling a report rate on a computer peripheral device, according to certain embodiments. Method 1000 can be performed by processing logic that may comprise hardware (circuitry, dedicated logic, etc.), software operating on appropriate hardware (such as a general purpose computing system or a dedicated machine), firmware (embedded software), or any combination thereof. For instance, in some embodiments, method 1000 may be performed by a host computing device, one or more networked computing devices, computing resources on the cloud, or the like, as would be appreciated by one of ordinary skill in the art with the benefit of this disclosure. To simplify explanation, the first report rate and second report rate will be 1 ms and 4 ms, respectively. However, one of ordinary skill in the art with the benefit of this disclosure would appreciate the many modifications, variations, and alternative embodiments thereof.

At operation 1010, method 1000 can include receiving (e.g., by a receiver coupled to a host computing device) a first report from a computer peripheral device, the first report including aggregated movement data detected by a motion sensor that corresponds to a tracked movement of the computer peripheral device with respect to an underlying surface, according to certain embodiments. Alternatively or additionally, other sensors can be controlled on any suitable computer peripheral device to generate corresponding sensor data. The computer peripheral device can be a computer mouse, virtual/augmented reality controller, remote control, game controller, or the like. Motion sensor data may correspond to a displacement of the computer input device along an underlying surface (e.g., as presented in the non-limiting embodiment of FIG. 7), movement in 3D space, or the like. Sensor data can come from any suitable type of sensor including an optical sensor (e.g., to detect 2D movement along a surface), Hall-type sensor (e.g., to detect a rotation of a scroll wheel using magnetic fields), touch sensitive sensor, resistive sensor, capacitive sensor, inertial measurement unit (e.g., to detect acceleration, movement in 3D space), accelerometer, gyroscope, or the like. Although the embodiment of FIG. 10 relates closely to a computer mouse and corresponding sensors, one of ordinary skill in the art with the benefit of this disclosure would appreciate the many options, modifications, variations, and alternative uses with respect to sensor types and computer peripheral devices.

At operation 1020, method 1000 can include computing (e.g., by the receiver) a current velocity of the computer peripheral device based on the aggregated movement data in the first report. Alternatively or additionally, an acceleration or positional movement may be computed, as described above.

At operation 1030, when the current movement (e.g., velocity, acceleration, and/or angle of a change in movement) reaches a threshold value method 1000 can continue to operation 1040, otherwise method 1000 can continue to operation 1050, as further described below. In some embodiments, a velocity threshold may be 4 inches per second (ips) (referring to a mouse movement along an underlying surface), an acceleration threshold may be 10 m/s (1 g), a change of direction threshold may be 10 degrees, etc. Higher or lower threshold values may be used, multiple threshold values may be used, or the like, as would be appreciated by one of ordinary skill in the art with the benefit of this disclosure. Typically, if any of the measurements is higher than one of these thresholds, the input device may be considered to be operating with high activity, thereby prompting the submission of reports at the first report rate. When the movement is below the threshold value, this may be indicative of a user operating the device in a manner or in a context that does not require fast report rates, such as a user using the computer peripheral device with slow movements, with a software application that does not need fast report rates (e.g., a spreadsheet application), the user currently is inactive, or the like. The method can continue by using predictive movement calculations to provide report rates by the receiver to a host computing device at a faster rate (e.g., 1 ms) than the receiver receives from the peripheral device (e.g., 4 ms) (operation 1060-1090) and cause the computer peripheral device to operate at a reduced report rate based on its current movement data, as further described below.

By way of example, a typical acceleration of 5 g is common for in-game movements, with higher end values at or around 20 g. At such acceleration, the maximum change of trajectory in 1 ms corresponds to 25 μm to 100 μm respectively or 0.75 optical sensor pixels, respectively 3 pixels. After 2 ms, this error could reach 100 μm to 400 μm respectively or 3 optical sensor pixels, respectively 12 pixels, which may be error compensated as described above.

At operation 1040, when the current movement does reach (e.g., at or above) a threshold value, method 1000 can further include generating and sending a first command to the computer peripheral device configured to cause the computer peripheral device to send subsequent reports of aggregated movement data at a first report rate (e.g., 1 ms report rate). For example, movement at or above the threshold value may be indicative of a scenario where fast performance is preferred (e.g., an FPS-based video game), so the receiver (or host computer device) can dynamically control the computer peripheral device to send reports more quickly. This may be achieved by causing the computer peripheral device to poll its corresponding movement sensors at an increased rate or just to send aggregated reports at a faster rate. One of ordinary skill in the art with the benefit of this disclosure would appreciate the many modifications, variations, and alternative embodiments thereof. The first report (and some subsequent reports under the same conditions) can then be sent to the host computing device at the first report rate (operation 1090).

At operation 1050, when the current movement does not reach the threshold value, method 1000 can further include generating and sending a second command to the computer peripheral device configured to cause the computer peripheral device to send subsequent reports of aggregated movement data at a second report rate (e.g., 4 ms) that is slower than the first report rate. For example, movement below the threshold value may be indicative of a scenario where fast performance is not necessary (e.g., web browsing), so the receiver (or host computer device) can dynamically control the computer peripheral device to send reports more slowly. This may be achieved by causing the computer peripheral device to poll its corresponding movement sensors at a reduced rate or just to send aggregated reports at a slower rate. One of ordinary skill in the art with the benefit of this disclosure would appreciate the many modifications, variations, and alternative embodiments thereof.

At operation 1060, method 1000 can further include predicting (e.g., by the receiver) a trajectory of the computer peripheral device based on the first report; computing (e.g., by the receiver) a future incremental displacement of the computer peripheral device based on the predicted trajectory (operation 1070); generating (e.g., by the receiver) a second report that includes the computed current velocity of the computer peripheral device and a third report that includes the computed future incremental displacement of the computer peripheral device (operation 1080); and sending (e.g., by the receiver to the host computing device) the second and third reports at the first report rate (operation 1090). In some aspects, method 1000 can further include maintaining the first report rate between the receiver and the host computing device irrespective of the report rate of the computer peripheral device. For example, if the report rate received from the computer peripheral device is fast (e.g., 1 ms), the receiver can send reports at the fast rate (e.g., 1 ms) or other suitable predetermined rate where the reports reflect that actual movement of the computer peripheral device. Likewise, if the report rate received from the computer peripheral device is slow (e.g., 4 ms), the receiver still sends reports at 1 ms, but the reports may likely include predicted movement data of the computer peripheral device until new actual movement data is received to update/correct the current tracked position and movement of the computer peripheral device, as further described above.

It should be appreciated that the specific steps illustrated in FIG. 10 provide a particular method 1000 for dynamically controlling a report rate on a computer peripheral device, according to certain embodiments. Other sequences of steps may also be performed according to alternative embodiments. Furthermore, additional steps may be added or removed depending on the particular applications. For example, the first command may be configured to cause the computer peripheral device to change a polling rate for the motion sensor to a first polling rate and the second command can be configured to cause the computer peripheral device to change the polling rate for the motion sensor to a second polling rate that is slower than the first polling rate. In another example, in response to determining that the computer peripheral device is controlling software of a first type (e.g., web browser or other application that does not need high performance or fast report rates) operating on a host computing device, method 1000 can include generating and sending the second command to the computer peripheral device. In some cases, in response to determining that the computer peripheral device is controlling software of a second type (e.g., e-sports game or other application that does need high performance or fast report rates) operating on a host computing device, generating and sending the first command to the computer peripheral device.

In further embodiments, method 1000 can include computing, by the receiver, a current acceleration or motion direction of the computer peripheral device based on the aggregated movement data in the first report; in response to determining that the current acceleration is at or above an acceleration threshold value or the motion direction has changed at or above an angle threshold angle, sending the first command to the computer peripheral device; and in response to determining that the current acceleration is below the acceleration threshold value or the motion direction has changed below a threshold angle, sending the second command to the computer peripheral device.

In certain embodiments, method 1000 can cause a computer peripheral device to be dynamically controlled based on a current and/or predicted near-term movement of the computer peripheral device, based on a software application operating on the host device that the computer peripheral device is controlling, or the like. Put simply, method 1000 measures the activity of use and may cause the computer peripheral device to reduce a report rate when it is determined that fast movement is unlikely to occur and increase/maintain a report rate when it is determined that fast movement is likely. The embodiments described herein mostly described the analysis of movement data (e.g., velocity, position movement, acceleration, etc.) to do the predictive analysis. However, other sources of data can be used, such as pixel movement on a screen or other suitable source of data to base predictive analyses. One of ordinary skill in the art with the benefit of this disclosure would appreciate the many modifications, variations, and alternative embodiments thereof.

There are myriad applications that the predictive analysis techniques described herein can be used. By way of example, the following additional methods 1200-1400 provide predictive techniques that can be similar in scope as the other methods and systems described above (e.g., using systems as shown in FIGS. 1-4B), and can include additional features and implementations to illustrate its wide variety of uses.

Figure 12:
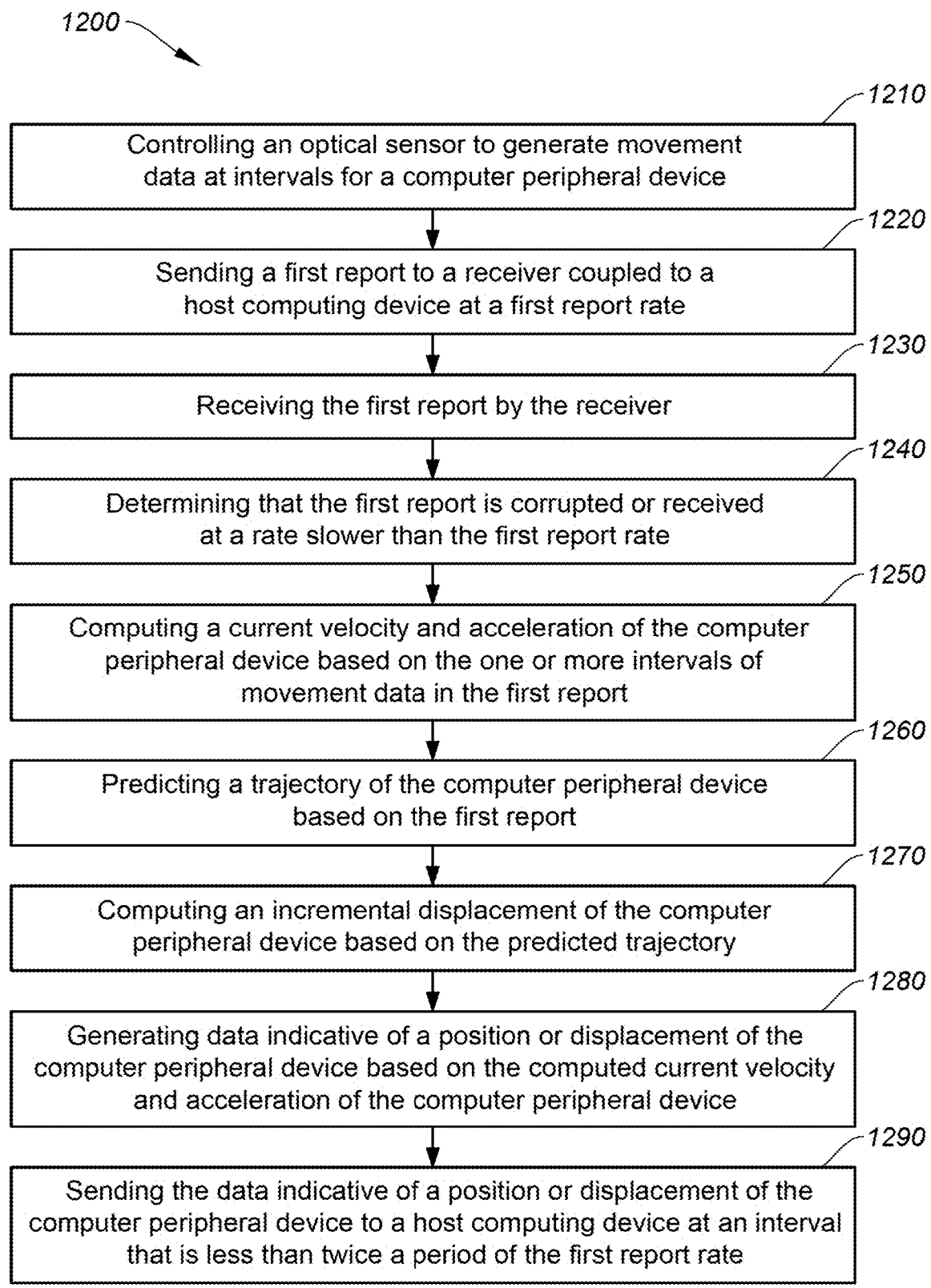
FIG. 12 is a simplified flow chart showing aspects of a method for predicting a position of displacement of a computer peripheral device when missing or corrupted reports occur, according to certain embodiments.

FIG. 12 is a simplified flow chart showing aspects of a method 1200 for predicting a position of displacement of a computer peripheral device when missing or corrupted reports occur, according to certain embodiments. Method 1200 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 1200 can be performed by receiver 400. In some cases, at least some operations of method 1200 can be performed by receiver 400 and some operations may be performed by the computer peripheral device. Alternatively or additionally, method 1200 may be performed by aspects of system 200, 300, 400, or a combination thereof.

At operation 1210, method 1200 can include controlling, by one or more processors on a computer peripheral device, an optical sensor disposed thereon, the optical sensor configured to generate movement data at intervals, the movement data corresponding to a tracked movement of the computer peripheral device with respect to an underlying surface, according to certain embodiments. Alternatively or additionally, an on-board IMU can be used to generate the movement data (e.g., acceleration data).

At operation 1220, method 1200 can include sending, by the one or more processors, a first report to a receiver coupled to a host computing device at a first report rate, the first report including one or more intervals of generated movement data, the first report being sent via a wireless communications protocol, according to certain embodiments.

At operation 1230, method 1200 can include receiving the first report by the receiver, according to certain embodiments.

At operation 1240, method 1200 can include determining, by the receiver, that the first report is corrupted or received at a rate slower than the first report rate, according to certain embodiments.

At operation 1250, method 1200 can include computing, by the receiver, a current velocity and acceleration of the computer peripheral device based on the one or more intervals of movement data in the first report, according to certain embodiments.

At operation 1260, method 1200 can include predicting, by the receiver, a trajectory of the computer peripheral device based on the first report, according to certain embodiments.

At operation 1270, method 1200 can include computing, by the receiver, an incremental displacement of the computer peripheral device based on the predicted trajectory, according to certain embodiments.

At operation 1280, method 1200 can include generating, by the receiver, data indicative of a position or displacement of the computer peripheral device based on the computed current velocity and acceleration of the computer peripheral device, according to certain embodiments.

At operation 1290, method 1200 can include sending, by the receiver to a host computing device, the data indicative of a position or displacement of the computer peripheral device at an interval that is less than twice a period of the first report rate, according to certain embodiments. In some aspects, predicting the trajectory of the computer peripheral device can be performed, in part, by a state estimator operating on the receiver, which may include a linear state estimator, or an extended Kalman filter configured to incorporate an estimated error to balance error correction of the computed current velocity and acceleration of the computer peripheral device. Typically, the first report rate is 6 ms or faster. As described in various embodiments above, the first report rate may be as fast as 1 ms or less. The second report rate is typically at least two times slower (e.g., first report rate=1 ms; second report rate=2 ms, 4 ms, or other slower rate). One of ordinary skill in the art with the benefit of this disclosure would appreciate the many modifications, variations, and alternative embodiments thereof.

In some implementations, method 1200 can further include controlling, by the one or more processors, an inertial measurement unit (IMU) on the computer peripheral device, the IMU configured to generate acceleration data corresponding to the tracked movement of the computer peripheral device with respect to the underlying surface. In typical implementations, the peripheral computing device is a computer mouse, the receiver is a USB dongle (or other wireless transceiver) physically (or remotely) and communicatively coupled to the host computing device.

It should be appreciated that the specific steps illustrated in FIG. 12 provide a particular method 1200 for predicting a position of displacement of a computer peripheral device when missing or corrupted reports occur, according to certain embodiments, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 13:
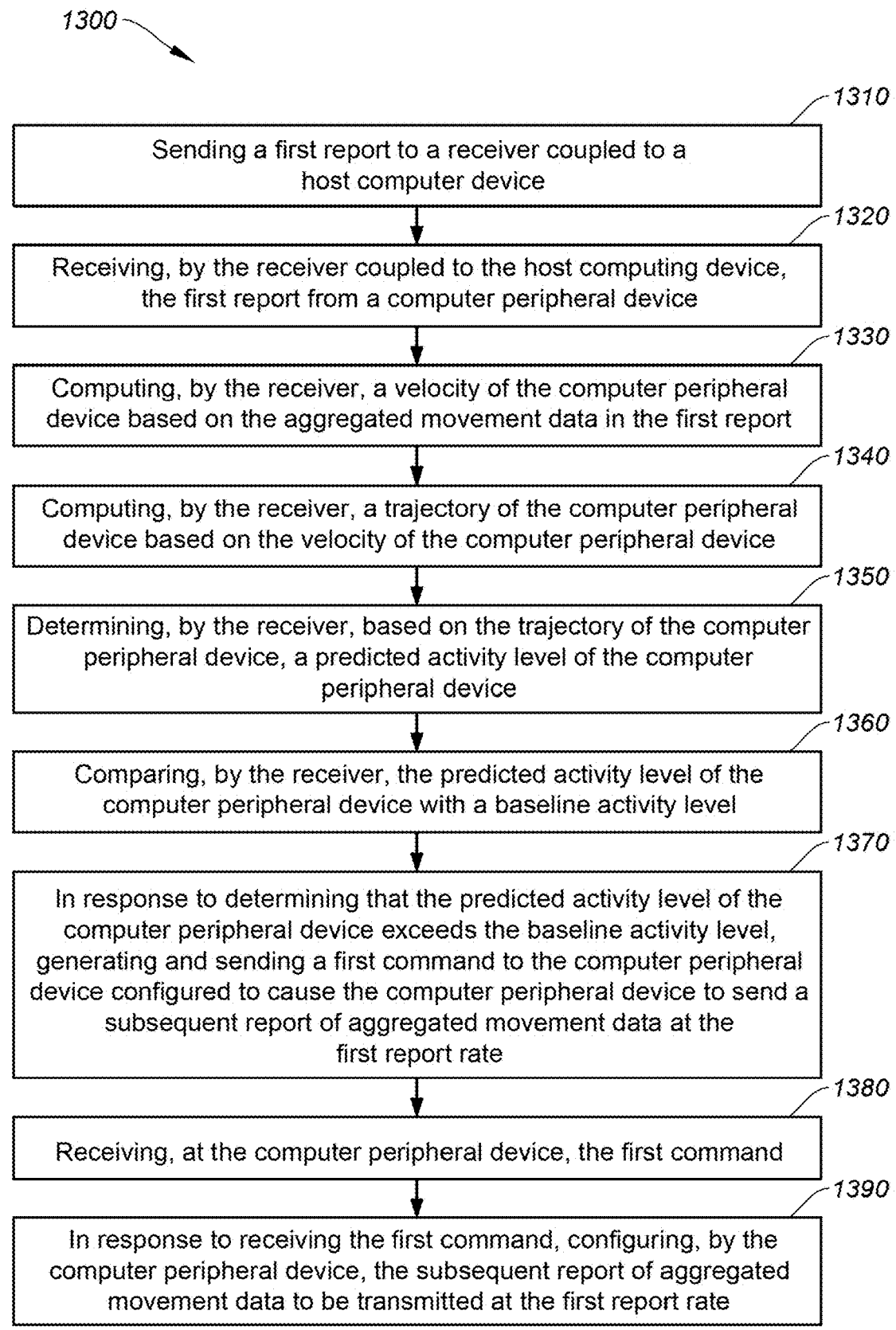
FIG. 13 is a simplified flow chart showing aspects of a method for dynamically controlling an operation of a computer peripheral device based on a predicted activity level, according to certain embodiments.

FIG. 13 is a simplified flow chart showing aspects of a method 1300 for dynamically controlling an operation of a computer peripheral device based on a predicted activity level, according to certain embodiments. In certain embodiments, method 1300 can be performed by receiver 400. In certain embodiments, at least some operations of method 1300 can be performed by receiver 400, and some operations may be performed by the computer peripheral device. Alternatively or additionally, method 1300 may be performed by aspects of system 200, 300, 400, or a combination thereof.

At operation 1310, method 1300 can include sending, by a computer peripheral device, a first report to a receiver coupled to a host computer device, according to certain embodiments. In some cases, the first report can include aggregated movement data detected by a motion sensor that corresponds to a tracked movement of the computer peripheral device with respect to an underlying surface. The computer peripheral device may be configured to transmit the first report at both a first report rate or a second report rate, the first report rate (e.g., 1 ms) being a higher report rate than the second report rate (e.g., 2 ms, 4 ms, 8 ms, or the like).

At operation 1320, method 1300 can include receiving, by the receiver coupled to the host computing device, the first report from a computer peripheral device, according to certain embodiments.

At operation 1330, method 1300 can include computing, by the receiver, a velocity of the computer peripheral device based on the aggregated movement data in the first report, according to certain embodiments.

At operation 1340, method 1300 can include computing, by the receiver, a trajectory of the computer peripheral device based on the velocity of the computer peripheral device, according to certain embodiments.

At operation 1350, method 1300 can include determining, by the receiver, based on the trajectory of the computer peripheral device, a predicted activity level of the computer peripheral device, according to certain embodiments. In some embodiments, the activity level of the computer peripheral device corresponds to an amount of randomness of the acceleration of the computer peripheral device over time. For example, rapid changes in acceleration may be indicative of high performance use of the peripheral device, like how a gamer might use a computer mouse in an e-sports application (e.g., FPS game). In such cases, the predicted activity level would tend to be high. Slower changes in acceleration may correspond more to office use. In those cases, the predicted activity level would tend to be comparatively low, as would be appreciated by one of ordinary skill in the art with the benefit of this disclosure.

In some embodiments, the activity level of the computer peripheral device corresponds, in part, to a location of the computer peripheral device on a mouse pad, and wherein the predicted activity level of the computer peripheral device exceeds the baseline activity level when the location of the computer peripheral device operates beyond a threshold distance from a reference location (e.g., center) on the mouse pad. For example, a computer mouse used in an office environment may primarily operate in a center portion of a mouse pad. In contrast, a computer mouse used in an e-sports gaming environment may move over a comparatively large surface of the mouse pad. The activity level may correspond this movement behavior and may incorporate other aspects such as an amount of time within and/or outside of the threshold distance, or a number of times the peripheral device traverses the threshold in a period of time (e.g., 10 s), etc. One of ordinary skill in the art with the benefit of this disclosure would appreciate the many modifications, variations, and alternative embodiments thereof.

At operation 1360, method 1300 can include comparing, by the receiver, the predicted activity level of the computer peripheral device with a baseline activity level, according to certain embodiments.

At operation 1370, method 1300 can include in response to determining that the predicted activity level of the computer peripheral device exceeds the baseline activity level, generating and sending a first command to the computer peripheral device configured to cause the computer peripheral device to send a subsequent report of aggregated movement data at the first report rate, according to certain embodiments.

At operation 1380, method 1300 can include receiving, at the computer peripheral device, the first command, according to certain embodiments.

At operation 1390, method 1300 can include in response to receiving the first command, configuring, by the computer peripheral device, the subsequent report of aggregated movement data to be transmitted at the first report rate, according to certain embodiments.

In some implementations, the computing the trajectory of the computer peripheral device can be performed by a state estimator operating on the receiver, wherein the state estimator can be one of a linear state estimator, a Kalman filter, or an extended Kalman filter configured to incorporate an estimated error to balance an error correction of the computed trajectory of the computer peripheral device.

In some embodiments, the first report can further include aggregated acceleration data detected by an inertial measurement unit (IMU) on the computer peripheral device that corresponds to a tracked acceleration of the computer peripheral device with respect to the underlying surface. In such cases, the method can further include: computing, by the receiver, an acceleration of the computer peripheral device based on the aggregated acceleration data in the first report and computing, by the receiver, the trajectory of the computer peripheral device based on the computed velocity and acceleration of the computer peripheral device.

In some aspects, in response to determining that the predicted activity level of the computer peripheral device is at or below the baseline activity level, the method can include generating and sending a second command to the computer peripheral device configured to cause the computer peripheral device to send the subsequent report of aggregated movement data at a second report rate that is slower than the first report rate. In other words, the computer peripheral device may dynamically change from a high performance report rate to a baseline report rate based on the predicted activity level, which may result in significant power savings for the peripheral computer device, among other benefits as described above.

In further embodiments, the receiver can be configured to always send aggregated movement data to the host computing device at the first report rate regardless if the first or second command is sent to the computer peripheral device. In other words, whether the computer peripheral device is sending reports at slow or fast report rates, the receiver may always send fast report rates. For instance, where the computer peripheral devices sends reports at fast report rates, the receiver may send at the same rate. However, where the computer peripheral device sends reports at a slow report rate, the receiver may use predictive analysis to determine how the computer peripheral device would be moving based on its previous movements (e.g., velocity, acceleration, etc.) and report the predicted movement at the fast rate until a new report is received. In some embodiments, the peripheral computing device is a computer mouse, the motion sensor is an optical sensor, and the receiver is a USB dongle physically and communicatively coupled to the host computing device, although any of the computer peripheral device, sensor, receiver, and host computing device may differ, as would be appreciated by one of ordinary skill in the art with the benefit of this disclosure.

It should be appreciated that the specific steps illustrated in FIG. 13 provide a particular method 1300 for dynamically controlling an operation of a computer peripheral device based on a predicted activity level, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 14:
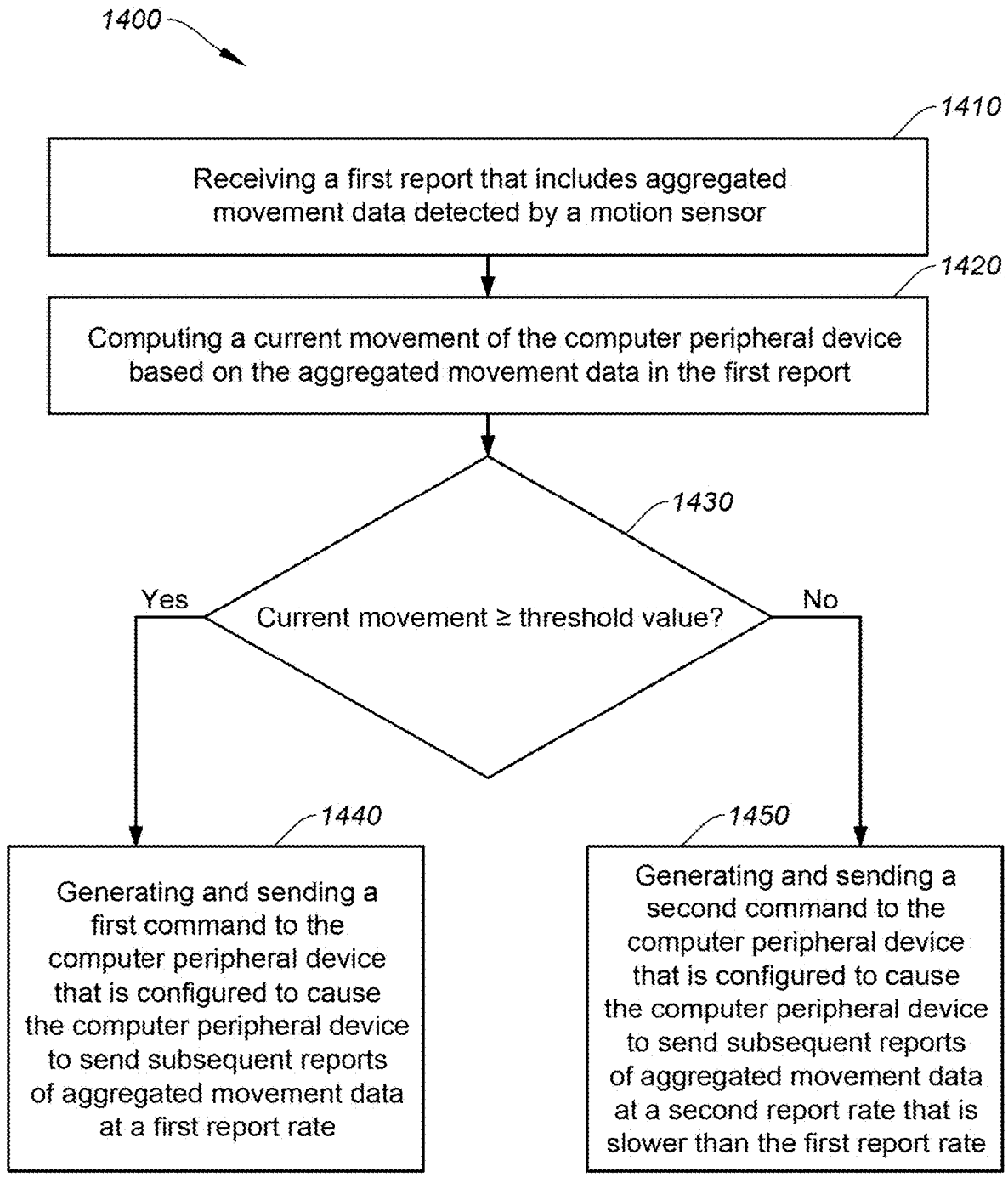
FIG. 14 is a simplified flow chart showing aspects of a method for dynamically controlling an operation of a computer peripheral device based on a current detected movement, according to certain embodiments.

FIG. 14 is a simplified flow chart showing aspects of a method 1400 for dynamically controlling an operation of a computer peripheral device based on a current detected movement, according to certain embodiments. In certain embodiments, method 1400 can be performed by receiver 400. In certain embodiments, at least some operations of method 1400 can be performed by receiver 400, and some operations may be performed by the computer peripheral device. Alternatively or additionally, method 1400 may be performed by aspects of system 200, 300, 400, or a combination thereof.

At operation 1410, method 1400 can include receiving, by a receiver coupled to a host computing device, a first report from a computer peripheral device, the first report including aggregated movement data detected by a motion sensor that corresponds to a tracked movement of the computer peripheral device with respect to an underlying surface, according to certain embodiments.

At operation 1420, method 1400 can include computing, by the receiver, a current movement of the computer peripheral device based on the aggregated movement data in the first report, according to certain embodiments.

At operation 1430, method 1400 can include, in response to determining that the current movement of the computer peripheral device is at or above threshold value, generating and sending a first command to the computer peripheral device that is configured to cause the computer peripheral device to send subsequent reports of aggregated movement data at a first report rate, according to certain embodiments (operation 1440).

Alternatively at operation 1430, in response to determining that the current movement of the computer peripheral device is below a threshold value, generating and sending a second command to the computer peripheral device that is configured to cause the computer peripheral device to send subsequent reports of aggregated movement data at a second report rate that is slower than the first report rate, according to certain embodiments (operation 1450).

In some implementations, the current movement can be a current velocity, and further in response to determining that the current velocity of the computer peripheral device is below a threshold value the method can include predicting, by the receiver, a trajectory of the computer peripheral device based on the first report; computing, by the receiver, a future incremental displacement of the computer peripheral device based on the predicted trajectory; generating, by the receiver, a second report that includes the computed current velocity of the computer peripheral device and a third report that includes the computed future incremental displacement of the computer peripheral device; and sending, by the receiver to the host computing device, the second and third reports at the first report rate.

In some cases, the method can include maintaining the first report rate between the receiver and the host computing device irrespective of the report rate of the computer peripheral device. For example, the receiver may send reports to the host computing device at 1 ms intervals, regardless of whether the computer peripheral device is sending reports at a fast rate (e.g., 1 ms) or slow rate (e.g., 8 ms—where the receiver predicts the movement and sends the prediction to the host computing device at the 1 ms report rate until the next report is received from the computer peripheral device). In some embodiments, the first command can be configured to cause the computer peripheral device to change a polling rate for the motion sensor to a first polling rate, and the second command is configured to cause the computer peripheral device to change the polling rate for the motion sensor to a second polling rate that is slower than the first polling rate. In certain embodiments, in response to determining that the computer peripheral device is controlling software of a first type operating on a host computing device, generating and sending the second command to the computer peripheral device and in response to determining that the computer peripheral device is controlling software of a second type operating on a host computing device, generating and sending the first command to the computer peripheral device.

In further embodiments, the method can further include computing, by the receiver, a current acceleration or motion direction of the computer peripheral device based on the aggregated movement data in the first report; in response to determining that the current acceleration is at or above an acceleration threshold value or the motion direction has changed at or above an angle threshold angle, sending the first command to the computer peripheral device; and in response to determining that the current acceleration is below the acceleration threshold value or the motion direction has changed below a threshold angle, sending the second command to the computer peripheral device. In some implementations, the computer peripheral device can be a computer mouse, the receiver can be physically coupled to the host computing device, and the receiver is wirelessly communicatively coupled to the computer peripheral device.

It should be appreciated that the specific steps illustrated in FIG. 14 provide a particular method 1400 for dynamically controlling an operation of a computer peripheral device based on a current detected movement, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Figure 15A:
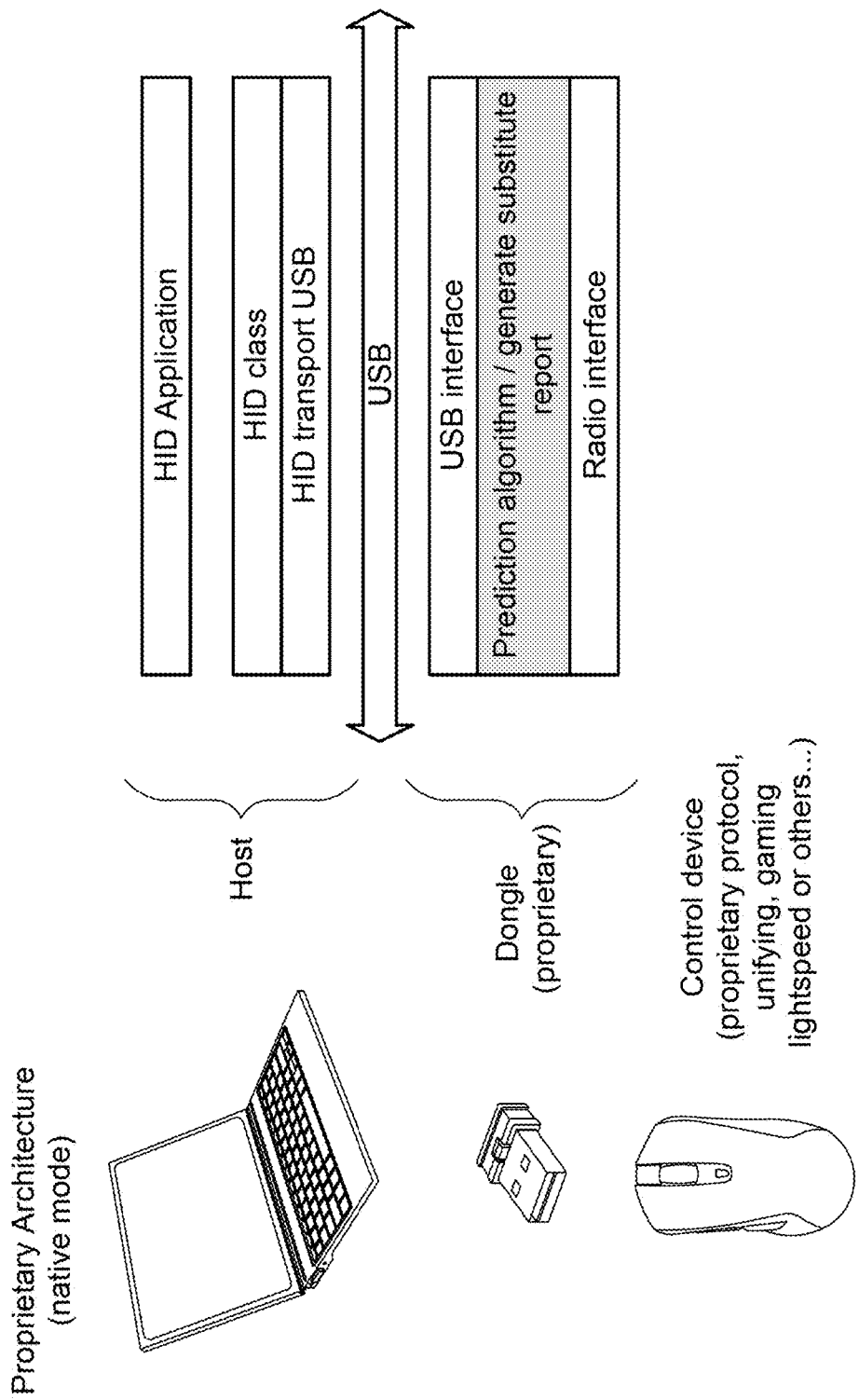
FIG. 15A shows a system with a receiver configured to perform a predictive analysis of a movement of a peripheral device, according to certain embodiments.
Figure 15B:
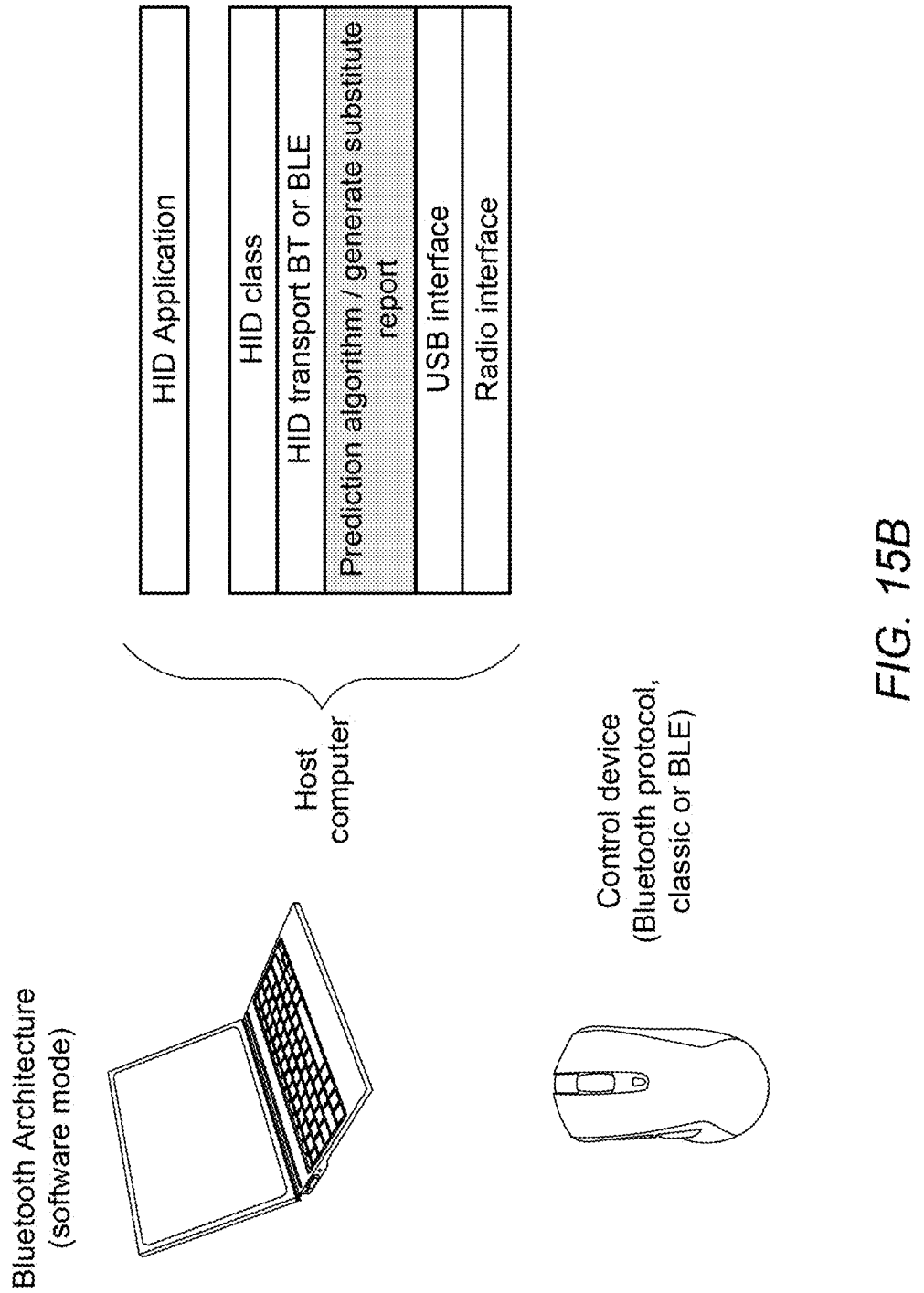
FIG. 15B shows a system with a host computing device configured to perform a predictive analysis of a movement of a peripheral device, according to certain embodiments.
Figure 15C:
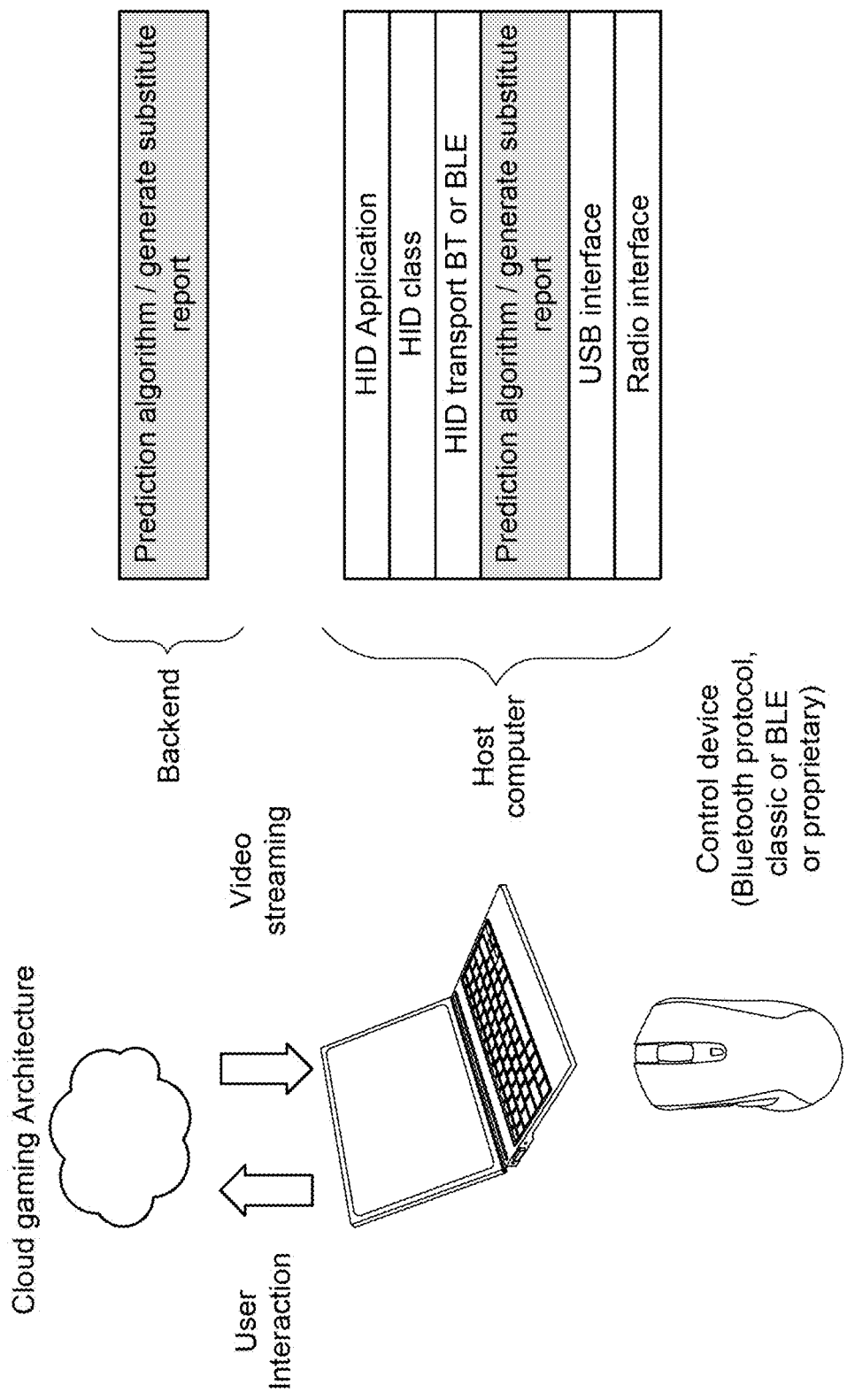
FIG. 15C shows a system with a remote server (e.g., on the cloud) configured to perform a predictive analysis of a movement of a peripheral device, according to certain embodiments.

It should be noted that any of the methods (see, e.g., FIGS. 6-10 and 12-14) and systems described herein can be performed by a receiver, by a host computing device, on the cloud at backend infrastructure, or a combination thereof, as would be appreciated by one of ordinary skill in the art with the benefit of this disclosure. FIG. 15A shows a typical example of the system where the predictive analysis is performed in whole or in large part by the receiver (e.g., a USB dongle), according to certain embodiments, and as further described above at least with respect to FIGS. 4A and 4B. FIG. 15B shows a typical example of the system where the predictive analysis is performed in whole or in large part by the host computing device, according to certain embodiments. FIG. 15C shows a typical example of the system where the predictive analysis is performed in whole or in large part by a backend system, such as on a remote server or other backend system, according to certain embodiments.

Many of the embodiments presented herein show how a movement of a computer mouse can be predicted and reported at increased report rates using the techniques described above. It should be understood that the predictive techniques can have wide-ranging applications. For instance, in addition to predicting a movement of a computer mouse over an underlying surface (e.g., 2D movement), as shown in FIG. 16A, some embodiments may be used to predict the rotation of an input element, such as a scroll wheel, as shown in FIG. 16B or movement of a computer peripheral device (e.g., a stylus) for in-air operation over three dimensions, as shown in FIG. 16C. One of ordinary skill in the art with the benefit of this disclosure would appreciate the many modifications, variations, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server(s) may also include database servers, including without limitation those commercially available from Oracle®, Microsoft®, Sybase®' and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. F or example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method comprising:
controlling, by one or more processors, an optical sensor disposed on a computer peripheral device, the optical sensor configured to generate movement data at intervals, the movement data corresponding to a tracked movement of the computer peripheral device with respect to an underlying surface;
sending, by the one or more processors, a first report to a receiver coupled to a host computing device at a first report rate, the first report including one or more intervals of generated movement data, the first report being sent via a wireless communications protocol;
receiving the first report by the receiver;
determining, by the receiver, that the first report is corrupted or received at a rate slower than the first report rate;

computing, by the receiver, a current velocity and acceleration of the computer peripheral device based on the one or more intervals of movement data in the first report;

predicting, by the receiver, a trajectory of the computer peripheral device based on the first report;

computing, by the receiver, an incremental displacement of the computer peripheral device based on the predicted trajectory;

generating, by the receiver, data indicative of a position or displacement of the computer peripheral device based on the computed current velocity and acceleration of the computer peripheral device; and sending, by the receiver to a host computing device, the data indicative of a position or displacement of the computer peripheral device at an interval that is less than twice a period of the first report rate.

2. The method of claim 1 wherein the predicting the trajectory of the computer peripheral device is performed by a state estimator operating on the receiver.

3. The method of claim 2 wherein the state estimator is a linear state estimator.

4. The method of claim 2 wherein the state estimator incorporates an extended Kalman filter configured to incorporate an estimated error to balance error correction of the computed current velocity and acceleration of the computer peripheral device.

5. The method of claim 1 wherein the first report rate is 6 ms or faster.

6. The method of claim 1 further comprising:

controlling, by the one or more processors, an inertial measurement unit (IMU) on the computer peripheral device, the IMU configured to generate acceleration data corresponding to the tracked movement of the computer peripheral device with respect to the underlying surface.

7. The method of claim 1 wherein the peripheral computing device is a computer mouse, and wherein the receiver is a USB dongle physically and communicatively coupled to the host computing device.

8. A computer-implemented method comprising:

receiving a first report from a computer peripheral device by a receiver at a first report rate, the first report including one or more intervals of movement data generated by the computer peripheral device, the movement data corresponding to a tracked movement of the computer peripheral device with respect to an underlying surface, and the first report being received via a wireless communications protocol;

determining, by the receiver, that the first report is corrupted or received at a rate slower than the first report rate;

computing, by the receiver, a current trajectory of the computer peripheral device based on the one or more intervals of movement data in the first report;

computing, by the receiver, a predicted trajectory of the computer peripheral device based on the first report;

computing, by the receiver, an incremental displacement of the computer peripheral device based on the predicted trajectory;

generating, by the receiver, data indicative of a position or displacement of the computer peripheral device based on the predicted trajectory of the computer peripheral device; and sending, by the receiver to a host computing device, the data indicative of a position or displacement of the computer peripheral device at an interval that is less than twice a period of the first report rate.

9. The method of claim 8 wherein the movement data includes velocity or acceleration data, and the current trajectory is computed based on the velocity or acceleration data.

10. The method of claim 8 wherein the computing the predicted trajectory of the computer peripheral device is performed by a state estimator operating on the receiver.

11. The method of claim 10 wherein the state estimator is a linear state estimator, a Kalman filter, or an extended Kalman filter configured to incorporate an estimated error to balance error correction of the computed current trajectory of the computer peripheral device.

12. The method of claim 8 wherein the first report rate is 6 ms or faster.

13. The method of claim 8 further comprising:

Controlling an inertial measurement unit (IMU) on the computer peripheral device, the IMU configured to generate acceleration data corresponding to the tracked movement of the computer peripheral device with respect to the underlying surface.

14. The method of claim 8 wherein the peripheral computing device is a computer mouse, and wherein the receiver is a USB dongle physically and communicatively coupled to the host computing device.

15. A system comprising:

one or more processors; and one or more machine-readable, non-transitory storage mediums that include instructions configured to cause the one or more processors to perform operations including:

receiving a first report from a computer peripheral device by a receiver at a first report rate, the first report including one or more intervals of movement data generated by the computer peripheral device, the movement data corresponding to a tracked movement of the computer peripheral device with respect to an underlying surface, and the first report being received via a wireless communications protocol;

determining, by the receiver, that the first report is corrupted or received at a rate slower than the first report rate;

computing, by the receiver, a predicted trajectory of the computer peripheral device based on the one or more intervals of movement data in the first report;

computing, by the receiver, a predicted trajectory of the computer peripheral device based on the first report;

computing, by the receiver, an incremental displacement of the computer peripheral device based on the predicted trajectory;

generating, by the receiver, data indicative of a position or displacement of the computer peripheral device based on the predicted trajectory of the computer peripheral device; and sending, by the receiver to a host computing device, the data indicative of a position or displacement of the computer peripheral device at an interval that is less than twice a period of the first report rate.

16. The system of claim 15 wherein the movement data includes velocity or acceleration data, and the predicted trajectory is computed based on the velocity or acceleration data.

17. The system of claim 15 wherein the computing the predicted trajectory of the computer peripheral device is performed by a state estimator operating on the receiver, which includes at least one of a linear state estimator, a Kalman filter, or an extended Kalman filter configured to incorporate an estimated error to balance error correction of the computed predicted trajectory of the computer peripheral device.

18. The system of claim 15 wherein the first report rate is 6 ms or faster.

19. The system of claim 15 further comprising:

controlling, by the one or more processors, an inertial measurement unit (IMU) on the computer peripheral device, the IMU configured to generate acceleration data corresponding to the tracked movement of the computer peripheral device with respect to the underlying surface.

20. The system of claim 15 wherein the peripheral computing device is a computer mouse, and wherein the receiver is a USB dongle physically and communicatively coupled to the host computing device.

* * * * *